United States Patent [19]

Kimura et al.

[11] Patent Number: 4,882,644
[45] Date of Patent: Nov. 21, 1989

[54] MAGNETIC HEAD SUPPORTING MECHANISM

[75] Inventors: Ippo Kimura; Naoyuki Okumura; Tomoe Aruga; Yoshio Arai, all of Nagano, Japan

[73] Assignee: Seiko Epson Corporation, Tokyo, Japan

[21] Appl. No.: 118,788

[22] Filed: Nov. 9, 1987

[30] Foreign Application Priority Data

| Nov. 12, 1986 | [JP] | Japan | 61-268956 |
| Nov. 12, 1986 | [JP] | Japan | 61-268954 |
| Nov. 13, 1986 | [JP] | Japan | 61-270754 |
| Nov. 13, 1986 | [JP] | Japan | 61-270753 |
| Nov. 25, 1986 | [JP] | Japan | 61-280313 |
| Nov. 25, 1986 | [JP] | Japan | 61-280312 |
| Jul. 13, 1987 | [JP] | Japan | 62-174218 |

[51] Int. Cl.$^4$ .............................................. G11B 5/48
[52] U.S. Cl. .................................................... 360/104
[58] Field of Search .................................... 360/104

[56] References Cited

U.S. PATENT DOCUMENTS

| 4,151,573 | 4/1979 | Tandon | 360/104 |
| 4,306,258 | 12/1981 | Higashiyama | 360/104 X |
| 4,651,243 | 3/1987 | Daste | 360/104 |
| 4,651,245 | 3/1987 | Kanno | 360/104 |
| 4,740,854 | 4/1988 | Shibuya | 360/104 |
| 4,791,501 | 12/1988 | Kumakura | 360/104 X |

Primary Examiner—A. J. Heinz
Attorney, Agent, or Firm—Spensley Horn Jubas & Lubitz

[57] ABSTRACT

A magnetic head supporting mechanism supports first and second magnetic heads in relation to a flexible magnetic disk in a manner such that the heads move in a generally perpendicular direction to the plane of the flexible disk. The motion of the heads is constrained by the spring rate of the supporting plates in the generally perpendicular direction to the plane of the flexible disk and the warping of the plates is further constrained by the torsional rigidities of the plates. The spring rate and the torsional rigidities of the supporting plates are set within preferred ranges.

13 Claims, 18 Drawing Sheets

MAGNETIC HEAD SUPPORTING MECHANISM

BACKGROUND OF THE INVENTION

1. Field of the Invention

The present invention relates to magnetic head supporting mechanisms for use in magnetic recording systems and, more particularly, to magnetic head supporting mechanisms for use with double-sided media.

2. Description of the Prior Art and Related Information

Magnetic head supporting mechanisms for magnetic recording systems using both sides of a flexible disk may be divided into three types in accordance with the prior art.

One type, the so-called "IBM" type, has been used since IBM Corporation first developed the flexible disk drive. In this type, magnetic heads are carried on the leading ends of spring arms and pressed through projections suspended by press springs so that they can rotate in the radial and tangential directions of a flexible disk.

As the density of the magnetic recording apparatus using the flexible disk increases, however, the above-specified structure has been found unable to position the magnetic heads in prescribed positions with sufficient accuracy. This structure has not been adopted for use in magnetic recording systems using a flexible disk of 5.25 inches or less.

Prior art supporting mechanisms adopted at present for magnetic recording systems using flexible disks of 5.25 inches or less may be divided into the following two types.

FIGS. 3(a) and 3(b) are sections showing portions of the first type prior art supporting mechanism, and FIG. 4 is a perspective view of this first type supporting mechanism. In this first type supporting mechanism (which will be called the "double sided gimbal type"), a first magnetic head 55 and a second magnetic head 59 are mounted in a gimballed manner by a first supporting plate 56 and a second supporting plate 60, respectively, to hold a flexible disk 51 therebetween through first and second pivots 54a and 58a which are formed partially in first and second rigid carriages 54 and 58, respectively. The second carriage 58 is pressed toward the first carriage 54 by a holding plate 58b and a head pressing spring 58c.

In this first type magnetic head supporting mechanism, each magnetic head is mounted in a gimballed manner and has freedom of movement in two directions (as indicated by arrows 64 and 65 in FIG. 4). The freedom of movement is determined by the torsional rigidities of the first and second supporting plates 56 and 60. The torsional rigidities are made generally low at 200 g mm/rad or less so as to improve the followability of the magnetic heads to the flexible disk 51.

In the magnetic head supporting mechanism of the second type, the first magnetic head is fixed on the first carriage whereas the second magnetic head is mounted in a gimballed manner by a holding plate on a pivot formed in a portion of a second carriage, such that the flexible disk is held between the first and second magnetic heads. The second head has freedom of movement in two directions, in a manner as has been described with reference to FIG. 4, the freedom of movement being determined by the respective torsional rigidities of the supporting plate. Such a second type magnetic head supporting mechanism is shown in U.S. Pat. No. 4,151,573 to Sirjang L. Tandon et al.

With a view to compensating the unfollowability of the flexible disk because the first magnetic head is fixed on the first carriage, it is necessary to improve the followability of the second magnetic head to the flexible disk. For this reason, the torsional rigidity of the supporting plate of the second magnetic head is generally at 150 g mm/rad or less.

In the prior art first type magnetic head supporting mechanism, as has been described hereinbefore, the first magnetic head 55 and the second magnetic head 59 are borne by the first pivot 54a and the second pivot 58a, respectively, as shown in FIG. 3(a). In case the flexible disk 51 inclines, the first and second magnetic heads 55 and 59 will incline to follow the flexible disk 51 thereby to establish a displacement from the prescribed recording and reproducing position, i.e., the so-called "off-track" condition.

This "off-track" problem will be described in detail in relation to the illustrative diagram of FIG. 5. In FIG. 5, the first supporting plate 56 carried on the first carriage 54 and the second supporting plate 60 formed on the second carriage 58 are contacted with the first and second pivots 54a and 58a respectively such that they are regulated from warping toward the respectively corresponding carriages 54 and 58 and such that they can roll on the points contacting the first and second pivots 54a and 58a. If, for example, the flexible disk 51 moves up and down or warps, the first and second magnetic heads 55 and 59 are inclined for stabilization, while holding the flexible disk 51 therebetween, until the flexible disk 51 comes into balance with the torsion of the first and second supporting plates 56 and 60, as shown in FIG. 5.

In order to retain the data compatibility of the magnetic recording system, the recording and reproducing position of a recording and reproducing medium is standardized and specified. As shown in FIG. 5, the positioning of the recording and reproducing portions of the first magnetic head 55 and the second magnetic head 59 cause displacements or off-tracks of $\Delta X3$ and $\Delta X4$, respectively, from the original recording and reproducing positions of the disk 51. As a result, if the data are reproduced in this state, the reproductions are either incorrect, if possible, with a smaller amplitude of the reproduced signals, or impossible.

If, on the other hand, the data are recorded in that state and are reproduced by another normal magnetic recording apparatus, the amplitude of the reproduced signals decreases to make correct reproduction impossible. This can significantly drop the reliability of the magnetic recording apparatus, or cause the fatal defect that the magnetic recording apparatus will lose its compatibility.

In the second type prior art magnetic head supporting mechanism, on the other hand, the off-track condition as specified above will not occur. However, the followability of the inclination of the flexible disk is bad, since the first magnetic head is fixed. In order to attain a sufficient followability, the force (i.e., the so-called "head pressing force") for pressing the second magnetic head toward the first magnetic head must be increased. This invites a defect, however, in that the lifetime of the flexible disk is shortened.

In either the first type prior art magnetic head supporting mechanism (i.e., the double sided gimbal type) or the second type prior art magnetic head supporting mechanism (i.e., the single sided gimbal type), the first magnetic head 55 and the second magnetic head 59 (as shown in FIG. 3(a)) impact against each other through the flexible disk 51, when the second magnetic head 59 comes from the unloaded state (not-shown), in which it does not press the flexible disk 51, to the head loaded state (shown in FIG. 38(a)), in which the second magnetic head 59 presses the flexible disk 51. This impact will damage the magnetic film of the flexible disk 51 and will cause separation of the magnetic layer, depending upon how serious the damage is, to raise a problem that errors are made in the recording and reproducing operations.

In order to weaken the above-specified impact, there has been adopted in the prior art a method of damping the impact by attaching an oil damper to the second carriage to apply a braking force to the second carriage when in the head loaded state. This oil damper is expensive and raises another problem that it has such serious temperature dependencies that the oil viscosity will drop at a high temperature to degrade the damping effect and will rise at a low temperature to make the damper excessively effective.

Both the first type prior art magnetic head supporting mechanism and the second type prior art magnetic head supporting mechanism require the first and second pivots 54a and 58a, shown in FIG. 3(a). These pivots in turn raise the following problems, explained in relation to FIGS. 6 and 7, which are diagrams illustrating the coactions of the pivots and the supporting plates. For simplicity of explanation, only one head is shown, but similar explanations will apply to the other head.

In FIG. 6, the first magnetic head 55 holds the flexible disk 51 and is supported by the first supporting plate 56 having flexibility, which in turn is regulated by the first pivot 54a formed in the first carriage 54.

FIG. 7 shows the state in which the first magnetic head 55 inclines following the flexible disk 51. In this case, the first magnetic head 55 will incline following the flexible disk 51 whereas the first supporting plate 56 will have its tie bar 56y (also indicated at 56y in FIG. 4) warping to rotate on the sectional center 56b shown in FIG. 6. Since, however, the first supporting plate 56 is regulated by the first pivot 54a, it will turn as a matter of fact on the contact point between the first pivot 54a and the first supporting plate 56 (as seen from FIG. 7). By these actions, the tie bar position will be displaced, but this displacement has to be absorbed by the warp of an arm 56a (shown in FIG. 4). An excessive force is required for causing that warp.

More specifically, prior art structures having the first pivot 54a, forces are required for not only twisting the tie bar 56y but also warping the arm 56a in case the first magnetic head 55 inclines following the flexible disk 51. This requirement deteriorates the followability of the first magnetic head 55 to the flexible disk 51.

For the second supporting plate 60 and the second pivot 58a, the followability of the second magnetic head 59 to the flexible disk 51 is also deteriorated for the same reasons.

In order to compensate the deterioration of the followability, on the other hand, the torsional rigidities of the first and second magnetic head supporting plates 56 and 60 have to be reduced. As a result, the supporting plates are so thinned that they become weak relative to the external forces, thus raising another problem that the supporting plates are liable to be broken and deformed.

SUMMARY OF THE INVENTION

It is, therefore, an object of the present invention to solve the above-specified problems of the prior art and to provide a highly reliable magnetic held supporting mechanism which stabilizes the followability of magnetic heads to a flexible disk.

The present invention provides a structure in which the magnetic heads are supported in a manner to move in a generally perpendicular direction to the plane of the flexible disk. Both the spring rates in the generally perpendicular direction and the torsional rigidities in the radial and tangential directions of the flexible disk are set within preferred regions. This makes it possible to provide a highly reliable magnetic head supporting mechanism which can ensure sufficient followability of the magnetic heads to the flexible disk, improve the positional accuracy of the magnetic heads over the prior art, elongate the lifetime of the flexible disk and make the disk less susceptible to breakage.

According to a preferred embodiment of the present invention, there is provided a magnetic head supporting mechanism for use with a flexible disk made of a medium suitable for magnetic recording and reproducing, comprising: a first magnetic head for making contact with one side of said flexible disk; a first supporting plate for supporting said first magnetic head with freedom of movement in the radial and tangential directions of said flexible disk; a first carriage for mounting and carrying said supporting plate; a second magnetic head for making contact with the other side of said flexible disk to hold said flexible disk between itself and said first magnetic head; a second supporting plate for supporting said second magnetic head with freedom of movement in the radial and tangential directions of said flexible disk; a second carriage for mounting said second supporting plate and rotating said second supporting plate and said second magnetic head in a manner to face said first carriage, said second carriage being carried by said first carriage to follow the same; and press means for pressing said first magnetic head and said second magnetic head to each other, wherein said first supporting plate and said second supporting plate support said first magnetic head and said second magnetic head, respectively, such that they can move in a generally perpendicular direction to the plane of said flexible disk in a manner constrained solely by the spring rates of said first supporting plate and said second supporting plate in the generally perpendicular direction.

DESCRIPTION OF THE PREFERRED EMBODIMENTS

Figure 1:
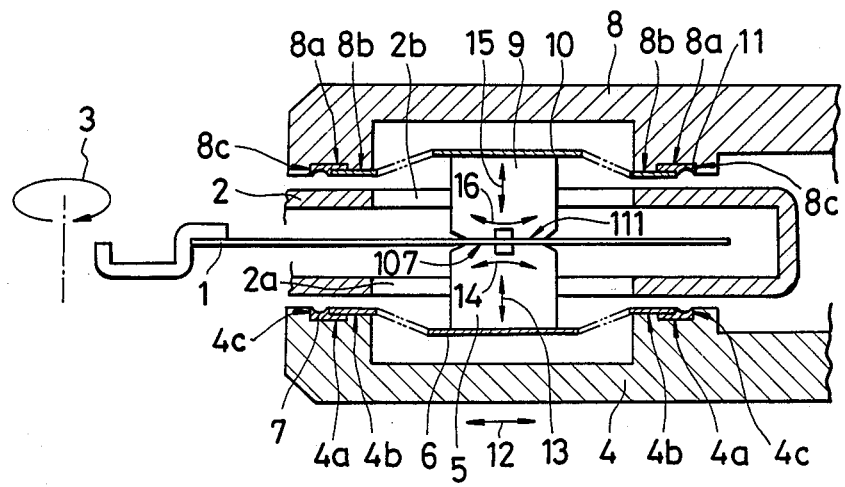
FIG. 1 is a section showing a portion of one embodiment of the magnetic head supporting mechanism according to the present invention.
Figure 2A:
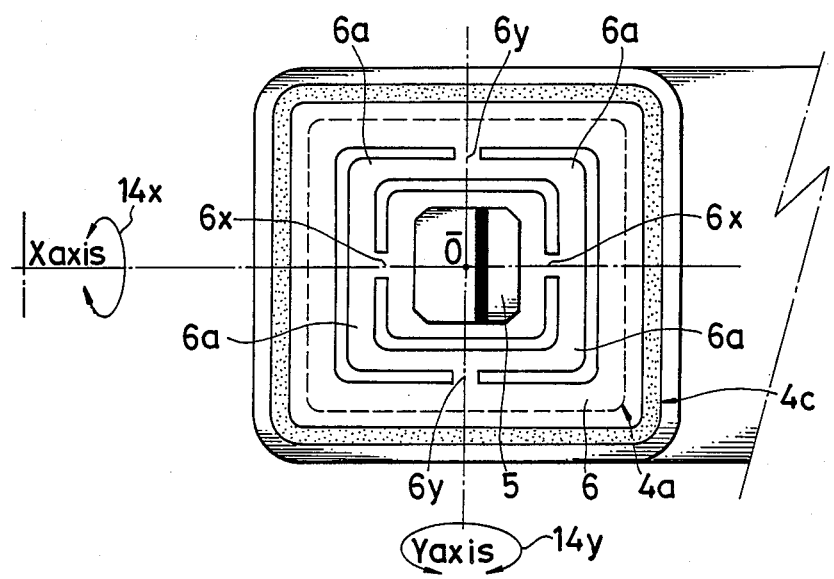
FIG. 2(a) is a top plan view and FIG. 2(b) is a section showing portions of one embodiment of the magnetic head supporting mechanism of the present invention.

FIG. 1 is a section showing a portion of one embodiment of the magnetic head supporting mechanism of the present invention, and FIG. 2(a) is a top plan view showing a portion of the magnetic head supporting mechanism.

In FIG. 1, a floppy disk 1 having a protective jacket 2 is shown inserted into the head supporting mechanism. A first carriage 4 is made movable in the radial directions (as indicated by arrows 12) of the flexible disk 1 and has mounted thereon a first magnetic head 5 through a first supporting plate 6. On the other hand, a second carriage 8 is made rotatable (although not shown) in a manner to face the first magnetic head 5 and is carried to follow the first carriage 4. Urging means are provided for urging the first and second carriages toward each other. This second carriage 8 has mounted thereon a second magnetic head 9 through a second supporting plate 10 and is spaced by 30 mm to 100 mm from its center of rotation to the magnetic head 9.

Referring to FIG. 2(a), the first supporting plate 6 is constructed of a very thin sheet of metal or resin and has a size of about 20 mm × 20 mm. This first supporting plate 6 is formed in its platen with grooves, by which a tie bar 6y is allowed to twist in the radial directions (as indicated by arrows 14y) of the flexible disk 1 whereas an arm 6a joining the tie bar 6y to a tie bar 6x is allowed to warp so that the magnetic head 5 can rotate on the center line (i.e., Y axis) of the tie bar 6y following the inclination of the flexible disk 1 (as shown in FIG. 1) to come into close contact with the flexible disk 1. Likewise, the tie bar 6x is allowed to twist in the tangential directions (as indicated by arrows 14x) of the flexible disk 1 whereas the arm 6a is allowed to warp so that inclination of the flexible disk 1 (as shown in FIG. 1). The thickness and shape of the first supporting plate 6 are so determined that the torsional rigidities in the tangential and radial directions of flexible disk are about 400 g·mm/rad to 3,000 g·mm/rad.

The second supporting plate 10 is also made to have a structure similar to that of the first supporting plate 6 and is given the freedom of movement in the tangential and radial directions of the flexible disk by a similar mechanism (not shown) so that the magnetic head 9 can rotate following the inclination of the flexible disk 1 (as shown in FIG. 1). The thickness and shape of this second supporting plate 6 are determined like the first one such that the torsional rigidities in the directions of flexible disk are set at about 400 g·mm/rad to 3,000 g·mm/rad.

Moreover, the first and second supporting plates 6 and 10 support the first and second magnetic heads 5 and 9, respectively, such that the heads 5 and 9 can move in generally perpendicular directions to the flexible disk plane (as indicated by arrows 13 and 15 in FIG. 1). Since the first and second supporting plates 6 and 10 are resilient in those directions, their respective arms 6a (as shown in FIG. 2(a)) and 10a (not shown) are caused to warp by the force (which will be called the "head pressing force") of pressing the second magnetic head 9 toward the first magnetic head 5 until they are stabilized in the warping state.

The thicknesses and shapes of the first and second supporting plates 6 and 10 are so constructed that the spring rate of the first and second supporting plates 6 and 10 in those directions takes about 50 g/mm or more.

Figure 3A:
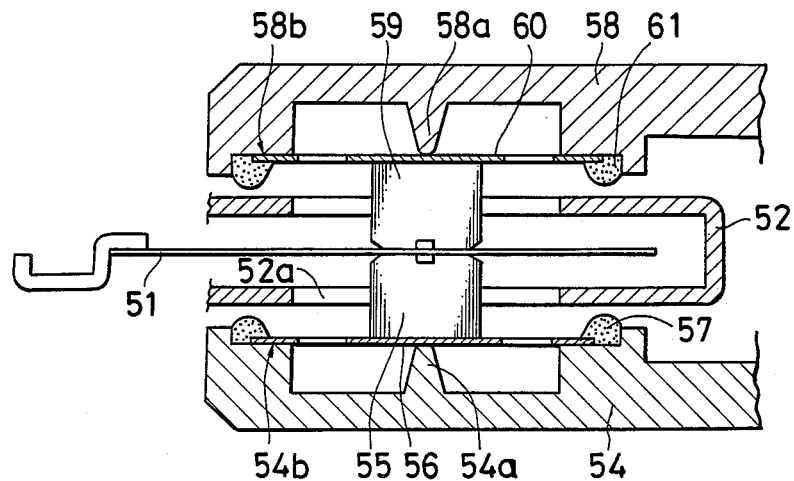
FIGS. 3(a) and 3(b) are sections showing essential portions of examples of a magnetic head supporting mechanism of the prior art.

In the structure described above, the first and second magnetic heads 5 and 9 are supported on the plates 6 and 10 so that they can move in the generally perpendicular directions (as indicated by the arrows 13 and 15) to the plane of the flexible disk 1. This structure makes it possible to eliminate the first and second pivots 54a and 58a (as shown in FIG. 3(a)) which have been indispensable for the prior art, thereby to eliminate the deterioration of the followability due to the pivots, as has been described in relation to the prior art. If, however, the supporting plates of the prior art are used as they are, the first and second supporting plates 56 and 60 (referring to FIG. 3(a)) will highly warp in the generally perpendicular directions to the plane of the flexible disk 51, thus raising a practical problem.

In order to solve this problem, it is necessary to increase the rigidities of the supporting plates in the above-specified direction. With excessively high rigidities, on the contrary, the thicknesses of the supporting plates will naturally increase to raise the torsional rigidities. These excessively high torsional rigidities will in turn deteriorate the aforementioned followability.

From the discussion thus far made, it can be concluded that both the rigidities of the supporting plates generally perpendicular to the plane of the flexible disk and the torsional rigidities should preferably be within strictly limited proper ranges. These ranges are experimentally determined, as defined below. That is to say, the spring rates taken generally perpendicular to the plane of the flexible disk are about 50 g/mm or more, and the torsional rigidities in the radial and tangential directions of the flexible disk are about 400 g·mm/rad to 3,000 g mm/rad. These rigidity values are calculated from the following data.

First of all, as shown in FIG. 1, the spring rates generally perpendicular to the plane of the flexible disk (as indicated by the arrows 15 and 13) are restricted by the following points. The above-specified head pressing force (which generally takes a value of about 20 g, as will be described later in more detail) is exerted to warp the first and second supporting plates 6 and 10 in the directions of the arrows 13 and 15. As a result of these warps, the gap between the mounting portion of the first supporting plate 6 on the first carriage 4 and the mounting portion of the second supporting plate 10 on the second carriage 8 is narrowed. Generally speaking, the height of a magnetic head (i.e., the gap between the first supporting plate 6 and the contact face 107 of first magnetic head) is about 2.5 mm so that the gap between those two supporting plates is about 5 mm. Moreover, the first and second supporting plates 6 and 10 are warped 0.4 mm (if the spring rate in those directions is assumed to be 50 g/mm), respectively, by the above-specified head pressure so that the gap between the two supporting plates is reduced to 4.2 mm.

With the larger warps, the jacket 2 for enveloping the flexible disk may possibly come into contact with the first or second supporting plates 6 or 10 or the first or second carriage 4 or 8. In the case of a flexible disk of 3.5 inches, for example, a jacket for enveloping the flexible disk has its thickness standardized to about 3.4 mm. This contact is caused by the dimensional variation of the first and second carriages 4 and 8 and the jacket 2. If this contact occurs, a desired head pressing force may not be applied to the magnetic heads to generate a sufficient reproduction output. In order to overcome this problem, it is necessary that the spring rate in those directions be 50 g/mm or more.

Here, the equation of F=kx holds if the pressing force of the first carriage 8 is designated as F, the warp of the supporting plates 6 and 10 in the directions of the arrows 13 and 15 as x, and the spring rate of the supporting plates 6 and 10 perpendicular to the plane of the magnetic disk 7 as k. In the unloaded state, the displacement x=0. When the state changes from the unloaded one to a head loaded one, the second magnetic head 9 drops to impinge upon the first magnetic head 5 through the flexible disk 1 so that the displacement takes its maximum (although not shown) of x+α (wherein α designates an increment of the warp due to the impingement). The supporting plates 6 and 10 have their spring rates determined for damping the impact on the premise that they have elastic limits higher than the load at that maximum displacement, i.e., the maximum impact.

Next, the torsional rigidity of the first supporting plate 6 has two components—the torsional rigidity components of the tie bars 6x and 6y and the contribution to the torsional rigidity resulting from the warp of the arm 6a (referring to FIG. 2(a)). The latter contribution is set higher than the former components, as in the second supporting plate 10.

On the other hand, the rigidity generally perpendicular to the plane of the flexible disk 1 is also determined substantially depending upon the warps of the arms 6a and 10a. In case the thicknesses and shapes of the arms 6a and 10a are so determined that said rigidities may take 50 g/mm or more, the spring rates of the contribution to the torsional rigidities due to the warp of the arm 6a will naturally rise with the torsional rigidity of the supporting plates as a whole. In order to drop these torsional rigidities, what can be done is to thin and elongate the tie bars 6x and 6y (shown in FIG. 2(a)) or 10x and 10y (not shown). Then, the first and second supporting plates 6 and 10 and the first and second carriages 4 and 8 are so large-sized that the tie bars 6x, 6y, 10x and 10y have their durabilities degraded for practical use.

From the above discussion, it can be said that the torsional rigidities at 400 g·mm/rad are preferred as a proper and realizable value.

Next, the upper limit of the torsional rigidities of the supporting plates is so determined that the aforementioned followability is not be deteriorated. This followability is determined depending upon the aforementioned head pressing force and the torsional rigidities of the plates and becomes better for a higher head pressure force and lower torsional rigidities. However, a high head pressing force will invite a disadvantage in that the lifetime of the flexible disk is shortened. For example, magnetic recording systems using a flexible disk of 5.25 inches at one time employed a head pressing force of about 30 g. In recent years, however, the head pressing force applied is frequently at about 20 g so as to elongate the lifetime of the flexible disk.

Therefore, the present invention presumes a head pressing force at about 20 g to set the preferable region of the rigidities of the supporting plates for the satisfactory followability.

Figure 8:
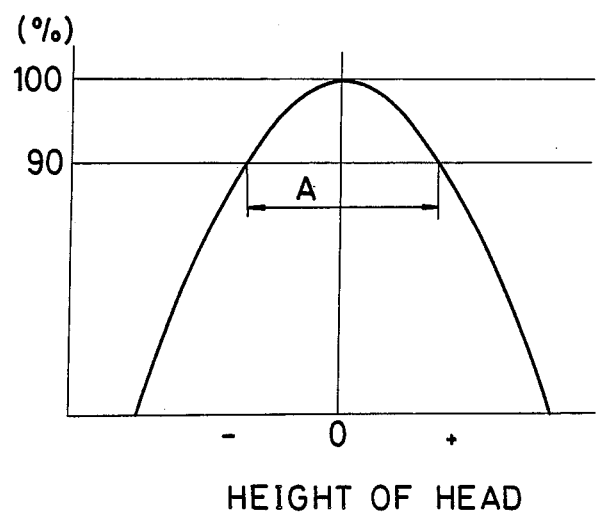
FIG. 8 is a diagram illustrating an example of the reproduced output of a magnetic recording apparatus.

FIG. 8 is a diagram for explaining the reproduced output of the double-sided magnetic recording apparatus. The abscissa plots the relative distance (which will be called the "head height") between the nominal plane of the flexible disk and the contact face 107 of the first magnetic head 5 shown in FIG. 1 with the magnetic recording medium, whereas the ordinate plots the reproduced output voltage of the magnetic head 5 at a ratio to the maximum reproduced output voltage.

FIG. 8 explains that a sufficient reproduced output voltage cannot be obtained no matter whether the head height might increase or decrease. The followability of the heads can be said to be better for a larger allowable width (as designated at A in FIG. 8) of the head height, at which a reproduced output voltage of 90% or more of the maximum value is obtained. For an allowable width A of 0.15 mm or less, it becomes very difficult to adjust the head height to that allowable width A, thus losing mass-productivity.

The allowable width A of the head height was measured for the supporting plates of various torsional rigidities and tabulated in Tables 1 and 2.

Table 1 enumerates the measured values of the allowable width of the head height of the magnetic head supporting mechanism for a flexible disk of 3.5 inches against the torsional rigidities of the supporting plate. Table 2 enumerates the measured values of the allowable width of the head height of the magnetic head supporting mechanism for a flexible disk of 5.25 inches against the torsional rigidities of the supporting plates.

TABLE 1

Head Height Allowable Width (mm) against
Torsional Rigidities of Supporting Plates

| | | Torsional Rigidity (g mm/rad) of Second Supporting Plate | | | | |
|---|---|---|---|---|---|---|
| | | 400 | 1,200 | 2,000 | 3,000 | 4,000 |
| Torsional Rigidity (g mm/rad) of First Supporting Plate | 400 | 0.34 | 0.29 | 0.31 | 0.33 | 0.35 |
| | 1,200 | 0.32 | 0.22 | 0.29 | 0.25 | 0.28 |
| | 2,000 | 0.34 | 0.25 | 0.24 | 0.20 | 0.21 |
| | 3,000 | 0.35 | 0.20 | 0.18 | 0.17 | 0.14 |
| | 4,000 | 0.35 | 0.13 | 0.09 | 0.12 | 0.11 |

TABLE 2

Head Height Allowable Width (mm) against
Torsional Rigidities of Supporting Plates

| | | Torsional Rigidity (g mm/rad) of Second Supporting Plate | | | | |
|---|---|---|---|---|---|---|
| | | 400 | 1,200 | 2,000 | 3,000 | 4,000 |
| Torsional Rigidity (g mm/rad) of First Supporting Plate | 400 | 0.84 | 0.68 | 0.54 | 0.40 | 0.35 |
| | 1,200 | 0.65 | 0.48 | 0.34 | 0.19 | 0.15 |
| | 2,000 | 0.50 | 0.31 | 0.20 | 0.09 | 0.09 |
| | 3,000 | 0.43 | 0.17 | 0.12 | 0.14 | 0.08 |
| | 4,000 | 0.40 | 0.13 | 0.08 | 0.08 | 0.10 |

From Table 1, it is found that the head height allowable width A becomes smaller than 0.15 mm so that the magnetic head supporting mechanism for the flexible disk of 3.5 inches is unsuitable for mass-production, if the torsional rigidity exceeds 3,000 g·mm/rad. From Table 2, it is also found that the head height allowable width A becomes smaller than 0.15 mm so that the magnetic head supporting mechanism for the flexible disk of 5.25 inches is unsuitable for mass-production, if the torsional rigidity exceeds 2,000 g·mm/rad.

If the torsional rigidities are summarized in view of the discussion made above, it can be said that the range of about 400 g·mm/rad to 3,000 g·mm/rad is preferable for maintaining the followability at a satisfactory level.

The magnetic head supporting mechanism according to the present invention as thus far described realizes the following several improvements:

(1) In the magnetic head supporting mechanism of the first type (i.e., the double-sided gimbal type) having been described in detail above as one example of the prior art, the rigidities of the supporting plates are made lower than necessary so that the magnetic heads are liable to be inclined in response to the inclination of the flexible disk 1 (as shown in FIG. 3(a)). This results in the aforementioned off-track. In the present invention, on the contrary, the torsional rigidities of the supporting plates are made about 2 to 15 times as high as those of the prior art so that the first and second supporting plates 6 and 10 (as shown in FIG. 1) and the first and second magnetic heads 5 and 9 are less inclined, thereby reducing the off-track.

Moreover, the magnetic heads are made movable in the generally perpendicular directions to the plane of the flexible disk 1 so that the off-track is further reduced with the following effects.

Figure 9A:
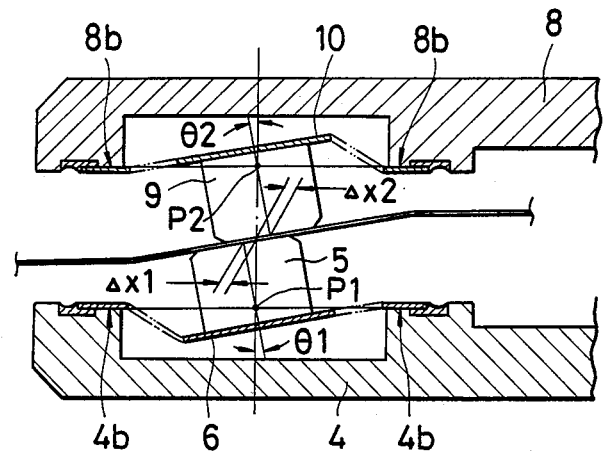
FIGS. 9(a) and 9(b) are diagrams illustrating the off-track condition due to the inclination of the magnetic heads in the present invention.
Figure 9B:
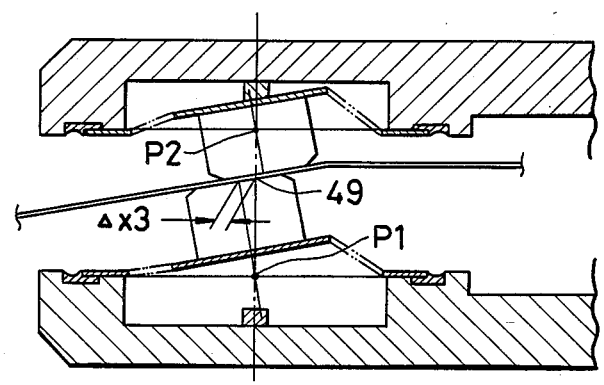

Referring to the diagrams of FIGS. 9(a) and 9(b), the off-track of the present invention may be explained. As has been described hereinbefore, the first supporting plate 6 warps in the generally perpendicular directions to the plane of the flexible disk 1 so that it is balanced with the aforementioned head pressing force. In this balanced state, the first magnetic head 5 is inclined on an imaginary fulcrum P1 which exists in a plane generally flush with a mounting face 4b of the first carriage 4 and on an imaginary line joining the mounting face 4b. If the angle $\theta 1$ of inclination of the first magnetic head 5 is common, the off-track $\Delta X1$ becomes smaller for the larger warp of the first supporting plate 6.

Likewise, the second supporting plate 10 warps in the generally perpendicular directions to the plane of the flexible disk 1 so that it is balanced with the aforementioned head pressing force. In this balanced state, the second magnetic head 9 is inclined on an imaginary fulcrum P2 which exists in a plane generally flush with a mounting face 8b of the second carriage 8 and on an imaginary line joining the mounting face 8b. If the angle $\theta 2$ of inclination of the second magnetic head 9 is common, the off-track X2 becomes smaller for the larger warp of the second supporting plate 10.

In this structure in which the first and second magnetic heads 5 and 9 are inclined together with the first and second supporting plates 6 and 10, the off-track is far smaller than that of the magnetic head supporting mechanism of the double-sided gimbal or singled-sided gimbal type which have been described as examples of the prior art. Even if the data are reproduced in this off-track state, the reduction of the amplitude of the reproduced signals is so slight that its influence upon the reproducing function may be neglected.

(2) The first and second supporting plates 6 and 10 have spring actions generally perpendicular to the plane of the flexible disk 1 so that they act as shock-absorbing members against impact in the head loaded state. In this head loaded state, the first and second magnetic heads 5 and 9 damp the impact upon the flexible disk 1. This damping effect can elongate the lifetime of the flexible disk 1 to enhance the reliability of the magnetic recording apparatus.

(3) Since the rigidities of the supporting plates are higher than those of the prior art, these supporting plates are stronger as against an external force. Therefore, the jacket 2 enveloping the flexible disk 1 is less likely to be broken by a defect such as a scratch, thereby improving the reliability.

A further aspect of the present invention will be described in relation to FIG. 1. As shown in FIG. 1, the supporting plates are warped by the aforementioned head pressing force when in the head loaded state. Even in this warping state, the first and second magnetic heads 5 and 9 are desired to be in parallel with their positions before the warp. In order to satisfy this desire, therefore, it is necessary to incorporate the following two structural features.

The first feature is that the center 0 (shown in FIG. 2(a)) of contact face 107 (shown in FIG. 1) of the first magnetic head 5 with the flexible disk 1, be aligned with the point of intersection between the center line (as indicated by an X axis in FIG. 2(a)) of the tie bar 6x of the supporting plate 6 and the center line (as indicated by a Y axis in FIG. 2(a)) of the tie bar 6y, as viewed in the perpendicular directions (as indicated by the arrows 13) to the head face 107, so that the first magnetic head 5 may not be inclined when a force is applied to the head face 107. In other words, the tie bars 6x and 6y are so arranged that the magnetic heads may be inclined on the center 0 of the head face 107 as the imaginary fulcrum.

Figure 10:
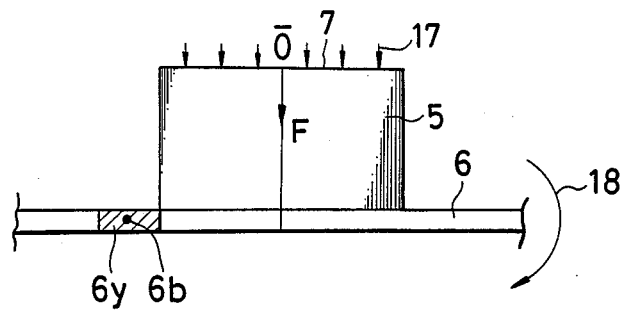
FIG. 10 is a diagram illustrating the inclination of a magnetic head as depending upon the tie bar position in the present invention.

FIG. 10 is a diagram for explaining the dependence of the inclination of the magnetic head upon the position of the tie bar. The first magnetic head 5 is mounted on the first supporting plate 6 and can rotate on the tie bar center 6b (as indicated by the Y axis in FIG. 2(a)). Moreover, the aforementioned head pressing force is exerted as a pressure (as indicated by arrows 17) upon the head face 107 by the opposite magnetic head 9 (not shown). Since this pressure can be replaced by a resultant force F exerted upon the center of the head face 107, it acts as a moment T (as indicated by an arrow 18) on the aforementioned Y axis so that the magnetic head 5 is inclined. In order to prevent this inclination, the Y axis is arranged on the line of action of the resultant force F. Then, the moment T is not established so that the inclination can be prevented if the tie bar center 6b (i.e., the Y axis) is generally aligned to the center 0 of the head face, as viewed in the perpendicular directions to the head face 107.

This discussion similarly applies to the X axis and the inclination is avoided if the point of intersection of the X and Y axes is aligned generally to the center of the head face, as viewed in the perpendicular directions to the head face 107. This is also true for the second supporting plate 10.

Next, the second feature will be described as follows. In case the four arms 6a (as shown in FIG. 2(a)) of the supporting plate 6 have different rigidities in the generally perpendicular directions to the plane of the flexible disk 1, even if the first feature thus far described is employed, the arm or arms having a lower rigidity warp more than the arm or arms having a higher rigidity so that the first and second magnetic heads 5 and 9 are inclined. This discussion similarly applies to the second supporting plate 10.

Figure 11:
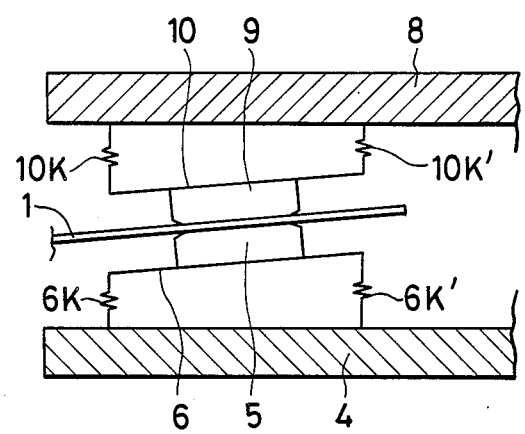
FIG. 11 is a diagram illustrating the inclination of the magnetic heads due to the difference in rigidity between the arms of the supporting plates in the present invention.

FIG. 11 is a diagram for explaining the inclinations of the magnetic heads due to the difference in the rigidity between the arms of the supporting plate.

Figure 12A:
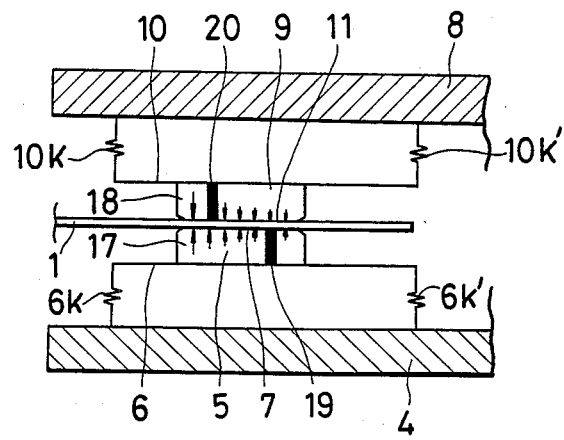
FIG. 12(a) is a diagram for explaining the pressure upon the head faces due to the rigidities of the arms.

FIG. 12(a) is a diagram for explaining the pressure upon the head face due to the rigidities of the arms.

In FIGS. 11 and 12(a), the first supporting plate 6 receiving the head pressing force warps to support the first magnetic head 5, and the second supporting plate 10 also warps to support the second magnetic head 9 so that they hold the flexible disk 1 therebetween.

One of the rigidities of the arms 6a of the first supporting plate is designated 6k, whereas the other is designated 6k', in case the rigidities are different. Likewise, the rigidities of the arms 10 of the second supporting plate 10a are designated 10k and 10k'.

FIG. 11 shows the case in which the rigidity 6k' is higher than the rigidity 6k whereas the rigidity 10k is higher than the rigidity 10k'. Then, the warp at the more rigid side is smaller than that at the less rigid side so that the first and second magnetic heads 5 and 9 are inclined.

In order to eliminate these inclinations of the first and second magnetic heads 5 and 9, it is sufficient to equalize either the rigidities 6k and 6k', and 10k and 10k' of the arms or the rigidities 6k and 10k and the rigidities 6k' and 10k' of the same sides.

FIG. 12(a) shows the case in which the rigidity 6k is higher than the rigidity 6k' whereas the rigidity 10k is higher than the rigidity 10k' and in which the rigidities 6k and 10k and the rigidities 6k' and 10k' of the arms are equal. In this case, the aforementioned head pressing pressure 18 applied to the head face 7 of the first magnetic head 5 and the head face 11 of the second magnetic head 9 is higher for the arms having the higher rigidity and lower for the arms having the lower rigidity.

Therefore, a core 20 for effecting the recording and reproducing operations of the second magnetic head 9 is positioned in the more radially inner side of the flexible disk 1 than a core 19 for effecting the recording and reproducing operations of the first magnetic head 5. Thus, the problem which arises when the recording density is so high as to invite a disadvantage in the recording and reproducing operations can be eliminated by raising the face pressing force to enhance the aforementioned followability.

In other words, if the rigidities of the arms facing the face of the flexible disk between the two supporting plates are made substantially equal whereas the rigidity of the arm closer to the core 20 of the second magnetic head 9 is made higher, the aforementioned head pressing pressure at the side closer to the core 20 of the second magnetic head 9 is increased. As a result, the core 20 for effecting the recording and reproducing operations of the second magnetic head 9 is positioned in the more radially inner side of the flexible disk 1 so that the disadvantage in the recording and reproducing operations due to the high recording density can be eliminated to improve the overall performance of the magnetic recording apparatus.

This structure can be applied to the case in which the arms of the supporting plates are asymmetric, as will be described as an example with reference to FIGS. 12(b), 12(c) and 12(d).

Figure 12B:
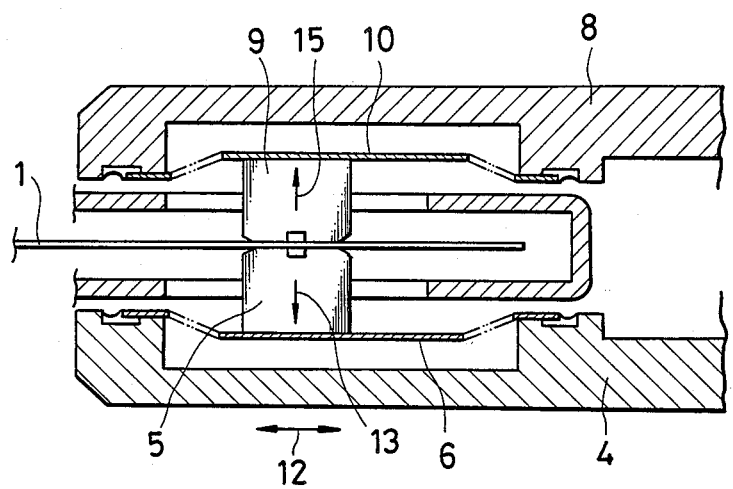
FIG. 12(b) is a section showing another embodiment of the magnetic head supporting mechanism of the present invention.

FIG. 12(b) is a section showing a portion of another embodiment of the magnetic head supporting mechanism according to the present invention; FIG. 12(c) is a top plan view showing a portion of a first magnetic head supporting mechanism; and FIG. 12(d) is also a top plan view but shows a portion of a second magnetic head supporting mechanism.

In FIG. 12(b), the first carriage 4 made movable in the radial directions (as indicated by the arrows 12) of the flexible disk 1 carries the first magnetic head 5 through the first supporting plate 6. Here, a broken-line frame indicated at A in FIG. 12(c) is a space provided for mounting lead wires, which makes the arms asymmetric. The second carriage 8, made rotatable (not shown) in a manner to face the first magnetic head 5 and carried to follow the first carriage 4, carries the second magnetic head 9 through the second supporting plate 10.

Figure 12C:
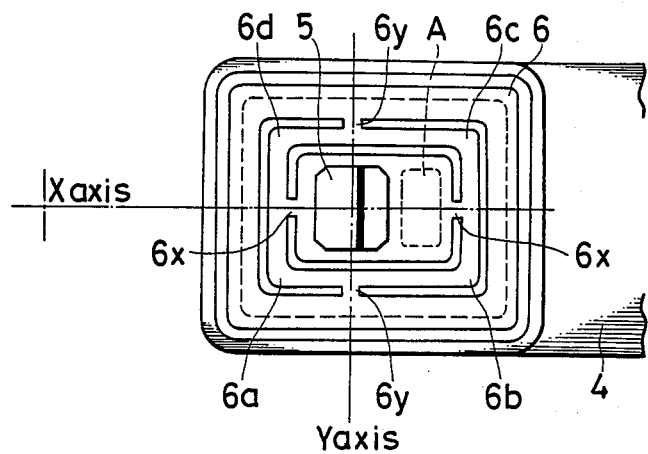
FIGS. 12(c) and 12(d) are two plan views showing portions of FIG. 12(b)
Figure 12D:
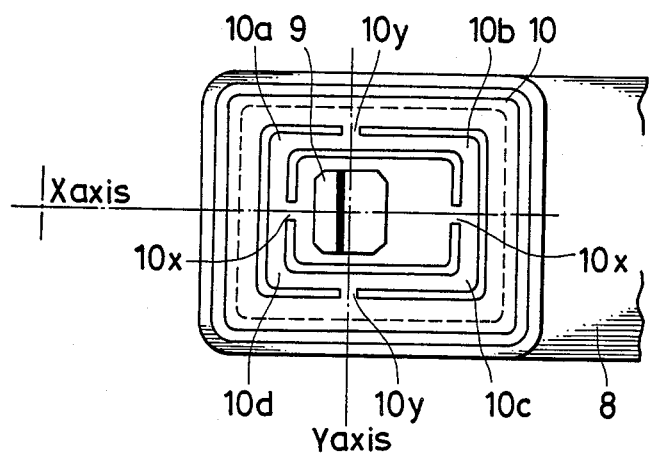

As shown in FIG. 12(b), moreover, the first supporting plate 6 has its arms 6a, 6b, 6c and 6d of FIG. 12(c) warping in the generally perpendicular direction to plane of said flexible disk 1, i.e., in the direction as indicated by the arrow 13 in FIG. 12(b), until the arms are stabilized in their slightly warped states. The second supporting plate 10 has its arms 10a, 10b, 10c and 10d (as shown in FIG. 12(d)) warping in the generally perpendicular direction to the plane of said flexible disk 1 (as indicated by the arrow 15 in FIG. 12(b)) until the arms are established in their slightly warped states.

In order that the torsional rigidity of the tie bar 6y or 6x of the first supporting plate 6 may be substantially equal to that of the tie bar 10y or 10x of the second supporting plate 10 and that the bending rigidities of the arms 6a, 6b, 6c and 6d of the first supporting plate 6 may be substantially equal to those of the arms 10a, 10b, 10c and 10d of the second supporting plate 10, both the tie bars (6x and 10x, and 6y and 10y) and the arms (6a and 10a, 6b and 10b, 6c and 10c, and 6d and 10d) of the first and second supporting plates 6 and 10 are made to have absolutely identical shapes, and the first and second supporting plates 6 and 10 are made of an identical material to have an identical thickness.

As in the embodiment described above, the two supporting plates are positioned to face each other through the plane of the flexible disk, and the flexible members are made to have substantially identical rigidities. The first and second magnetic heads 5 and 9 are stable without any inclination even if they hold the flexible disk 1 therebetween and can improve their followability to the flexible disk so that they can have their recording and reproducing operations stabilized.

FIGS. 13, 14, 15, 16 and 17 are top plan views showing other embodiments of the shapes of the first and second supporting plates 6 and 10, to which the present invention can be applied.

For simplicity of explanation, only the first supporting plate will be described, like the foregoing embodiments, with reference to FIGS. 13 to 17, but this description similarly applies to the second supporting plate. The first magnetic head 5 is supported on the first supporting plate 6 which in turn is carried by the first carriage 4. The first supporting plate 6 is formed in its plane with grooves, by which the first supporting plate 6 is divided to have: an outer frame 6c fixed on the first carriage 4; tie bars 6x and 6y for establishing torsional rigidities; a mounting portion 6d mounting the magnetic head; and an arm 6a for establishing a warp and a torsional rigidity. As a result, the magnetic head 5 can be inclined.

In the magnetic head supporting mechanism of the present invention, moreover, the supporting plate will warp when in the aforementioned head loaded state to have an effect to absorb the shock. At this time, the first and second supporting plates 6 and 10 are subjected to a high stress, which is liable to be concentrated at the two ends of the tie bars 6x, 6y, 10x and 10y to raise a problem in durability.

In order to prevent these stress concentrations, the two ends of the tie bars 6x, 6y, 10x and 10y are desired to be connected as smoothly as possible to the arms 6a and 10a.

From this point of view, the shape of the supporting plates will be examined in the following.

Figure 14:
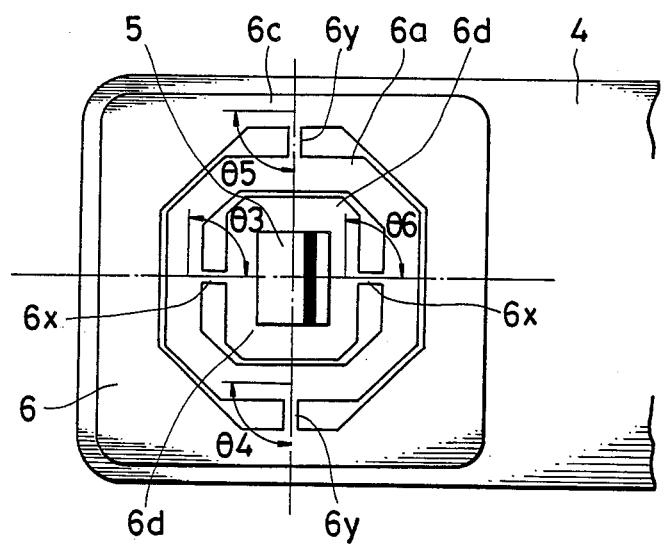
Figure 15:
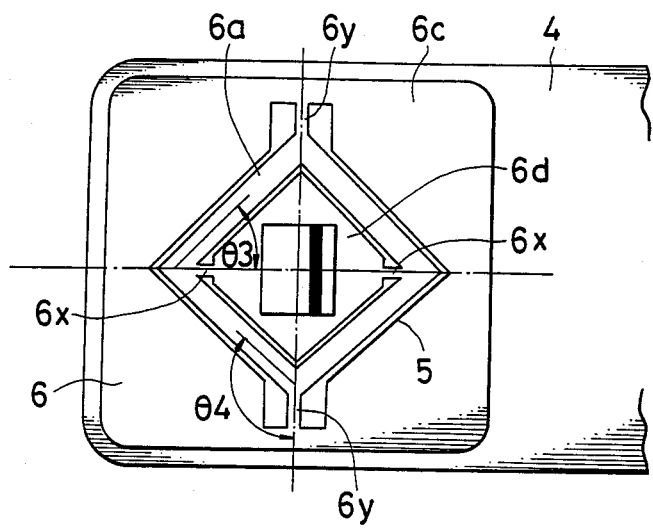
Figure 16:
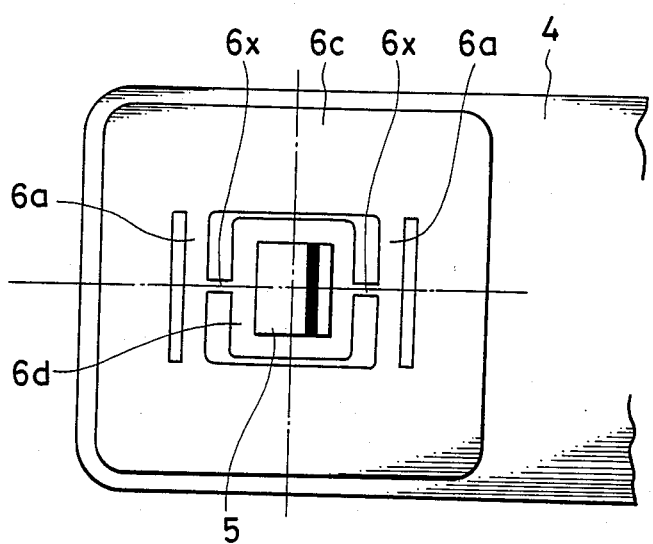
Figure 17:
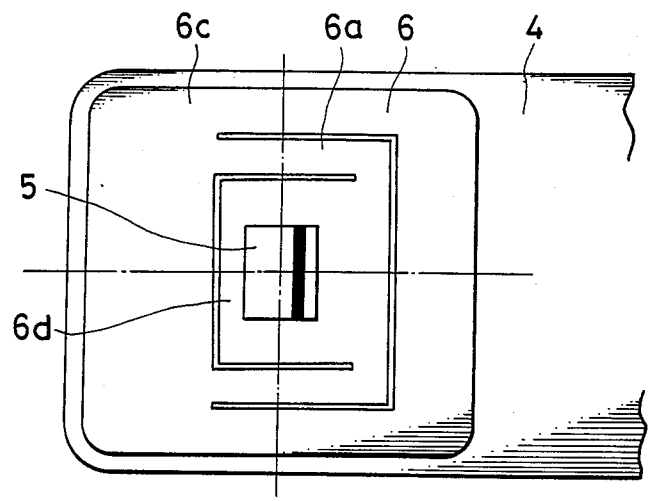

In the arm shape shown in FIG. 15, the angle 83 contained between the tie bar 6x and the arm 6a is disadvantageously small and is desired to be 90° or more, as shown in FIG. 14.

Likewise, the angle $\theta 4$ contained between the tie bar 6y and the arm 6a is desired to exceed 90°. By the same reasoning, not only the angle $\theta 5$ contained between the tie bar 6y and the outer frame 6c but also the angle $\theta 6$ contained between the tie bar 6x and the magnetic head supporting portion 6d is desired to exceed 90°. These angular determinations naturally apply to the second supporting plate 10.

Figure 13:
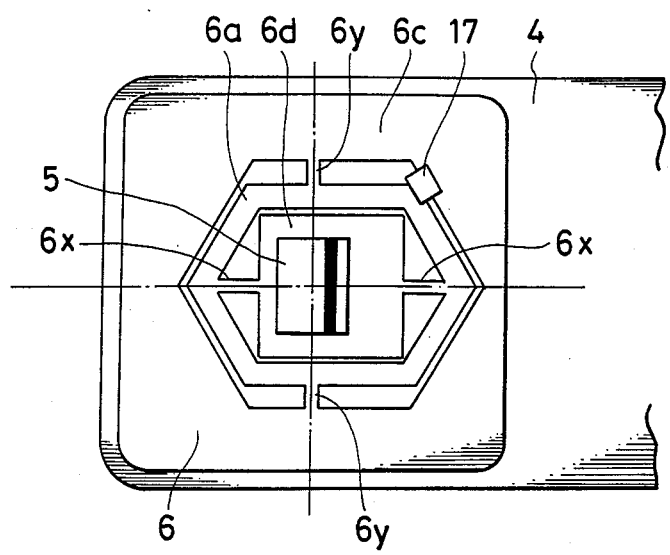
FIGS. 13 to 17 are top plan views showing portions of a supporting plate according to a further embodiment of the present invention.

In addition, the first or second magnetic head 5 of 9 may be vibrated during the recording and reproducing operations to make the reproduction output abnormal by the friction between the flexible disk 1 (as shown in FIG. 1) and the first and second magnetic heads 5 and 9. This phenomenon is called "head singing". In order to prevent this phenomenon, a member 17 (as shown in FIG. 13) made of a shock absorbing material such as rubber may be adhered to the first supporting plate 6 and/or the second supporting plate 10. This shock absorbing effect is enhanced if the member 17 is used to bridge either the arm 6a and the outer frame 6c and the arm 10a and the outer frame 10c or the arm 6a and the magnetic head mounting portion 6d and the arm 10a and the magnetic head mounting portion 10d.

Figure 21:
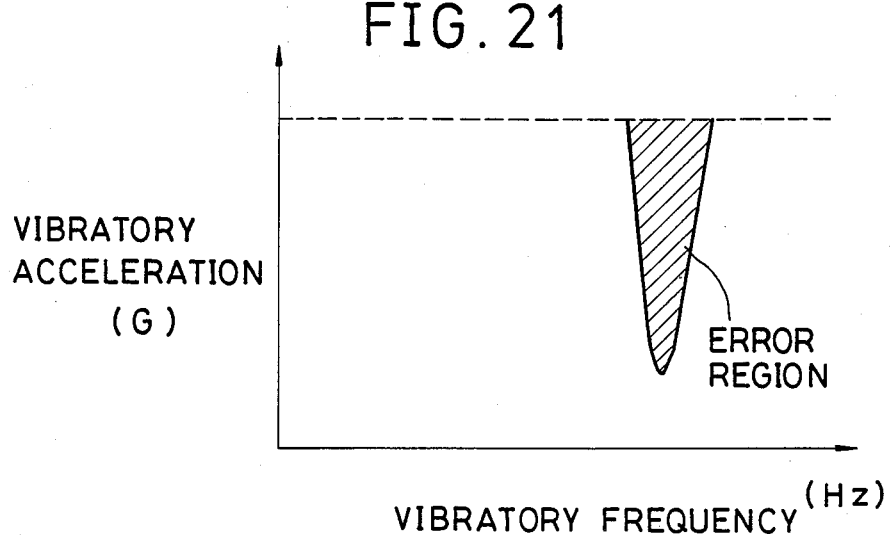
FIGS. 21 and 22 are diagrams for explaining how the present invention improves anti-vibration.
Figure 22:
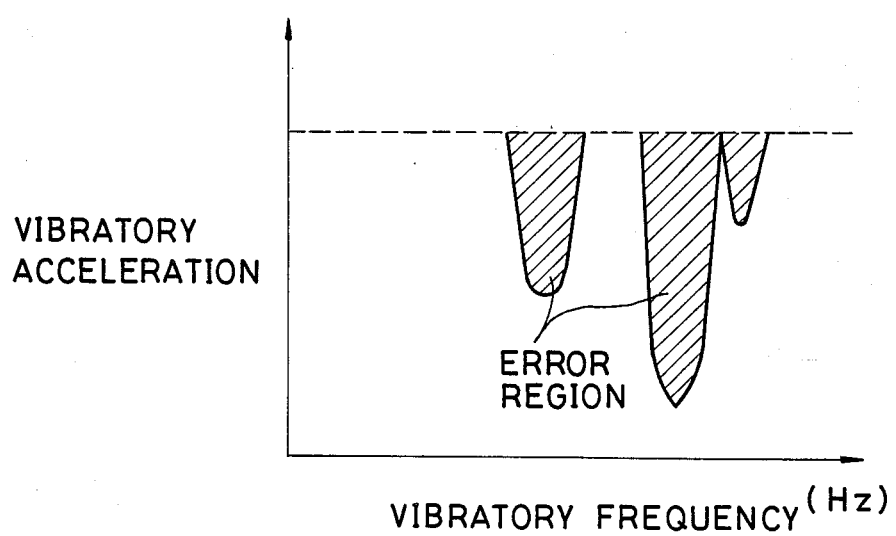

The anti-vibration is improved by leaving out the pivots as in the example of the prior art described above. FIG. 21 shows the error region, which is depicted against the vibratory frequency and the vibratory acceleration, in which the recording and reproducing operations are impossible for a model of the embodiment. As shown in FIG. 21, the error region appears in the vibratory frequency band which is resonant with that of the supporting plates. FIG. 22 depicts, against the vibratory frequency and the vibratory acceleration, the error regions in which the recording and reproducing operations are impossible for the example of the prior art. In FIG. 22, the error regions appear in several vibratory frequency bands, as is different from the case of the present invention as shown in FIG. 21. This is because the resonant vibrations of other mechanical components are allowed to propagate through the pivots to the supporting plates because these plates are supported by the pivots. As a result, in the present embodiment in which the supporting plates are not supported by the pivots, the vibration of the remaining mechanical components will not propagate to improve the anti-vibration.

Next, the fixing structure of the supporting plates 6 and 10 will be described in more detail with reference to FIGS. 1 and 2(a).

The prior art magnetic head supporting mechanism shown in FIG. 3(a) is accompanied by the following several problems, which are solved by the present invention.

Referring to FIG. 3(a), the first and second supporting plates 56 and 60 are so fixed on the mounting faces 54b and 58b, respectively, that they are enveloped with adhesives 57 and 61, respectively.

On the other hand, a cartridge 52 is made to a standardized size. In the structure in which the adhesives 57 and 61 envelope the first and second supporting plates 56 and 60, respectively, as shown in FIG. 3(a), the adhesives 57 and 61 cannot but bulge toward the cartridge 52 to reduce the gaps between the adhesives 57 and 61 and the cartridge 52.

As has been described hereinbefore, the first and second carriages 54 and 58 move in the direction of arrow 62 for the recording and reproducing operations. If there is a slight difference in the size of the cartridge 52, this cartridge 52 will come into contact during that movement with the adhesive 57 or 61. As a result, when the first and second magnetic heads 55 and 59 hold the disk 51 under a desired head pressing force for the recording and reproducing operations, this head pressing force will change due to the contact to potentially result in a defect such that the intrinsic recording and reproducing functions are lost.

This problem is solved by a preferred embodiment of the present invention as illustrated in FIGS. 1 and 2(a). Specifically, the first carriage 4 is formed with a space 4a which is located in a portion of the mounting face 4b and at a desired spacing from the first supporting plate 6, and a wall 4c which extends from the space 4a to enclose the outer circumference of the first supporting plate 6, as shown in FIG. 2(a) (which is a top plan view showing the first magnetic head 5 and the first supporting plate 6), and which has a desired height toward the first supporting plate 6, as shown in FIG. 1.

As shown in FIGS. 1 and 2(a) moreover, the first supporting plate 6 is fixed on the mounting face 4b by filling up the space 4a with the adhesive 7, and the wall 4c constitutes adhesive flow-out preventing means for preventing the adhesive 7 from flowing out.

Similarly, the second carriage 8 is formed with a space 8a which is located in a portion of the mounting face 8b and at a desired spacing from the second supporting plate 10, and a wall 8c which encloses the outer circumference of the second supporting plate from the space 8a (as shown in FIG. 2(a)) and which has a desired height toward the second supporting plate 10, as shown in FIG. 1. As shown in FIG. 1, moreover, the second supporting plate 10 is fixed on the mounting space 8b by filling up the space 8a with the adhesive 11, and the wall 8c constitutes adhesive flow-out preventing means for preventing the adhesive 11 from flowing out.

The following additional improvements have been incorporated into the magnetic head carrying structure according to the present invention.

(1) The fixing structures of the first and second supporting plates 6 and 10 will be described in the following. Since these fixing structures are common, the description will concentrate on the fixing structure of the first supporting plate 6, and a discussion of the fixing structure of the second supporting plate 10 will be omitted.

As has been described with reference to FIG. 1, the space 4a located at the desired spacing from the first supporting plate 6 is formed in a portion of the mounting face 4b of the first carriage 4, with the wall 4c having the desired height toward the first plate 6 such that it encloses the outer circumference of the first supporting plate 6 from that space 4a and acts as the adhesive flow-out preventing means. This space 4a is filled up with the adhesive 7 so that the first supporting plate 6 is fixed on the mounting face 4b. Then, the adhesive 7 is caused on the one hand to penetrate into space 4a by capillary action and also to be tensed along both the wall 4c, which acts as the adhesive flow-out preventing means, and along the outer circumference of the first supporting plate 6 by the action of the surface tension at the region, in which the space 4a is positioned at the outside of the outer circumference of the first supporting plate 6, as shown in FIG. 1. As a result, the adhesive 7 is prevented from bulging so that it can fix the first supporting plate 6 in the form of a meniscus.

Incidentally, if the space 4a, suitably spaced from the first supporting plate 6, is made to have a size of 0.05 mm to 0.3 mm, for example, the adhesive may preferably be anaerobic to drastically improve the adhering workability and reliability.

On the other hand, sufficient strength of the adhered structure is retained by the adhesive 7 filling up the space 4a. In the portion where the space 4a is positioned at the outside of the outer circumference of the first supporting plate 6, the adhesive 7 is prevented from bulging. Also in the meniscus portion, the adhesive 7 makes a positive contribution to the adhesion strength since the wall 4c not only performs the adhesive flow-out preventing function but also acts as an adhesive filling buffer means so that the dispersions of the charge of the adhesive 7 may be absorbed to stabilize the adhesion.

The wall 4c is constructed to continuously enclose the outer circumference of the first supporting plate 6, as shown in FIG. 2(a). The adhesive 7 will be caused to penetrate sufficiently into the space 4a by the aforementioned capillary action, if a suitable portion is filled up with a desired amount, thereby to ensure reliable adhesion and drastically improve the adhesion workability.

On the other hand, the construction of the wall 4c should not be limited to that in which the first supporting plate 6 has, its outer circumference enclosed, as shown in FIG. 2(a) but may be scattered in positions (although not shown) to perform the aforementioned adhesive flow-out preventing function and adhesive filling buffer function, thus effecting highly reliable adhesion. It should be appreciated that the filling of the adhesive 7 can be easily effected by multi-point filling means even if the wall 4c is scattered.

According to the fixing structures of the first and second supporting plates 6 and 10 thus far described, the adhesives 7 and 11 can facilitate highly reliable and stable fixtures without any bulge. The spacing between the adhesives 7 and 11 and the standardized cartridge 2 is sufficiently retained, as shown in FIG. 1. The first and second carriages 4 and 8 move for the recording and reproducing operations in the direction of the arrows 12 of FIG. 1. During these movements, the cartridge 2 is kept away from contact with the adhesive 7 or 11 even if the size of the cartridge 2 is varied.

The description thus far made has been directed exclusively to the first supporting plate 6, but the second supporting plate 10 has an identical structure so that a repeated description is omitted. In any event, the first and second supporting plates 6 and 10 and the adhesives 7 and 11 are kept away from contact with the cartridge 2. As a result, the aforementioned head pressing force will not change during the recording and reproducing operations so that the intrinsic recording and reproducing functions can be exhibited.

In accordance with the foregoing fixing structures, adhesives 7 and 11 can ensure highly reliable and stable adhesions without any bulge. Therefore, the adhesion workability is excellent for mass-productivity since the amounts of the adhesives 7 and 11 to be charged need not be finely administered.

Incidentally, the structure, in which the first supporting plate 6 warps generally toward the first carriage 4 whereas the second supporting plate 10 warps generally toward the second carriage 8, can prevent the adhesives 7 and 11 from bulging. This structure can be easily made for similar functions by fusing or welding means, for example, even if the structure fixes the first and second supporting plates 6 and 10 (although not shown).

Another aspect of the present invention will be described with reference to FIG. 2(b).

Figure 2B:
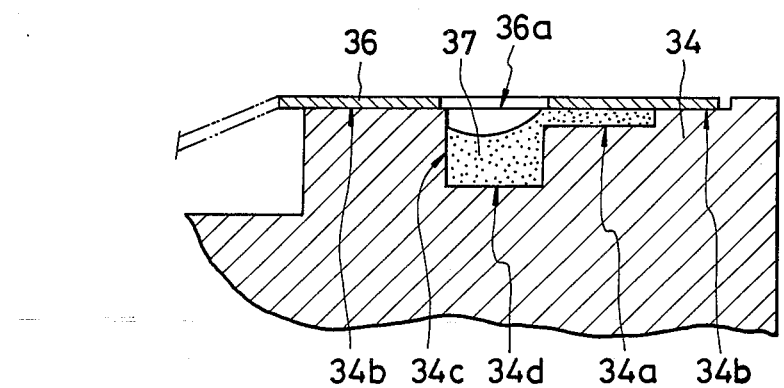

FIG. 2(b) is a diagram showing in detail a portion of a fixing structure according to another embodiment of the present invention. The portions other than that shown in FIG. 2(b) are similar to the aforementioned ones shown in FIGS. 1 and 2(a), and exhibit similar functions and effects, which will be omitted here. The portion of the fixing structure to be described with reference to FIG. 2(b) is therefore merely partially described and applied to the fixtures of the individual parts described with reference to FIGS. 1 and 2(a).

In FIG. 2(b), a first carriage 34 made movable by moving means (not shown) carries the aforementioned first magnetic head (not shown) through a first supporting plate 36 which is mounted on mounting face 34b.

The first carriage 34 is formed with a space 34a which is located in a portion of the mounting face 34b and at a desired spacing from the first supporting plate 36, and a space 34d which extends from the former space 34a but is located at a larger spacing from the first supporting plate 36 than the space 34a. Moreover, the first supporting plate 36 is formed with a hole 36a which is positioned to face the spaces 34a and 34d. As a result, the first supporting plate 36 is fixed on the mounting face 34b by filling up the space 34a and 34d with an adhesive 37 through the hole 36a, as shown in FIG. 2(b).

With the fixing structure described above, the adhesive 37 will be caused to penetrate sufficiently into the space 34a by the capillary action, as in the structure shown in FIGS. 1 and 2(a). In the portion of the other space 34d, on the other hand, the adhesive 37 will be tensed by the action of the surface tension, as shown in FIG. 2(b), along both the first supporting plate 36 and the wall 34c extending from the space 34d to the first supporting plate 36 so that it avoids bulging and forms a meniscus.

Moreover, the strength of this adhered structure is sufficiently ensured by the adhesive 37 filling up the space 34a. In a portion of the space 34d in which the adhesive 37 forms the meniscus while avoiding bulging by the surface tension, the adhesive 37 does not function to increase the adhesion strength but rather functions to absorb the dispersions in the charged amount of the adhesive 37 to thereby ensure stable adhesion. Thus, the adhesive 37 performs as the adhesive filling buffer means as in the fixing structure of FIGS. 1 and 2(a).

Figure 18:
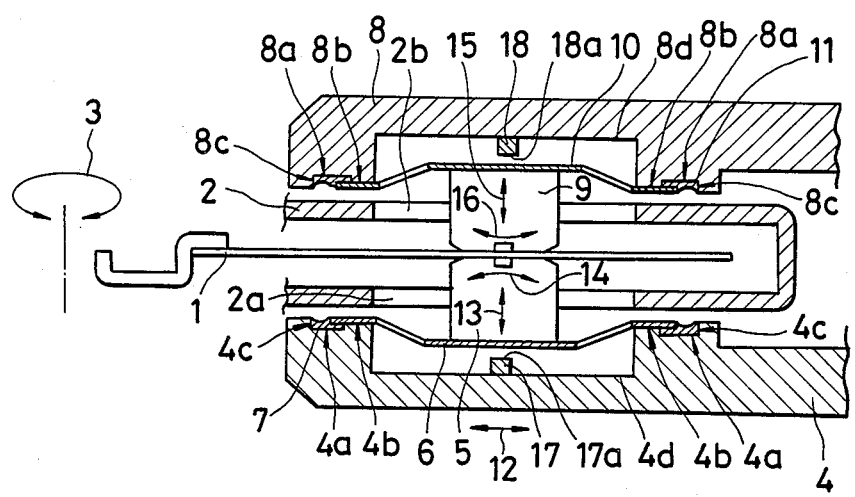
FIGS. 18, 19 and 20 are sections showing portions of a further embodiment of the magnetic head supporting mechanism of the present invention.
Figure 19:
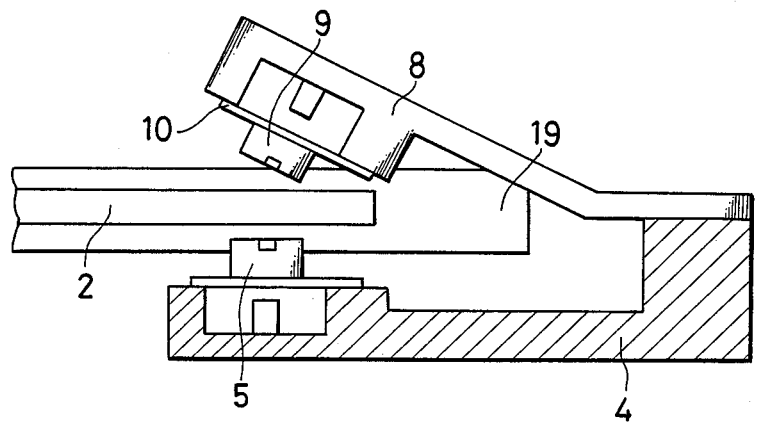

Referring to FIGS. 1 and 19, a structure for preventing excessive warps of the supporting plates 6 and 10 will next be described. A detailed description of FIG. 18 will be omitted because the structure is similar to that of FIG. 1 except for the generally column-shaped projections 17 and 18, shown in FIG. 18.

In the recording or reproducing state shown in FIG. 18, the first supporting plate 6 is warped to a predetermined extent by the head pressing force. The first column 17 arranged to project integrally from the carriage 4 from the bottom 4d of the carriage 4 to the first supporting plate 6 has its leading end 17a positioned at a predetermined slight spacing to face the face of the first supporting plate 6, on which the magnetic head 5 is mounted in the warped state. Likewise, the second supporting plate 10 is warped to a predetermined extent by the head pressing force. The second column 18 arranged to project integrally from the carriage 8 from the bottom 8d of the carriage 8 to the second supporting plate 10 has its leading end 18a positioned at a predetermined slight spacing to face the face of the second supporting plate 10 on which the magnetic head 9 is mounted in the aforementioned head loaded state.

FIG. 19 is a schematic diagram showing an essential portion of the carriage of the present embodiment while the carriage is in the head unloaded state before and after the recording and reproducing operations.

In this head-unloaded state, the second carriage 8 is in engagement with the holder 19 which accommodates the recording medium and receives and holds the disk cartridge 2 in the magnetic recording apparatus to move it to the recording and reproducing position. The second carriage 8 waits in a position at a spacing equal to the thickness of the disk cartridge 2 between the first and second magnetic heads 5 and 9.

As the holder 19 moves to the recording and reproducing position while holding the disk cartridge 2, the second magnetic head 9 comes close to the first magnetic head 5 carried on the first carriage 4 until it is carried to the recording and reproducing position, together with the first magnetic head 5, in close contact with the magnetic medium 1 by the head pressing force of the second carriage 8.

Figure 20:
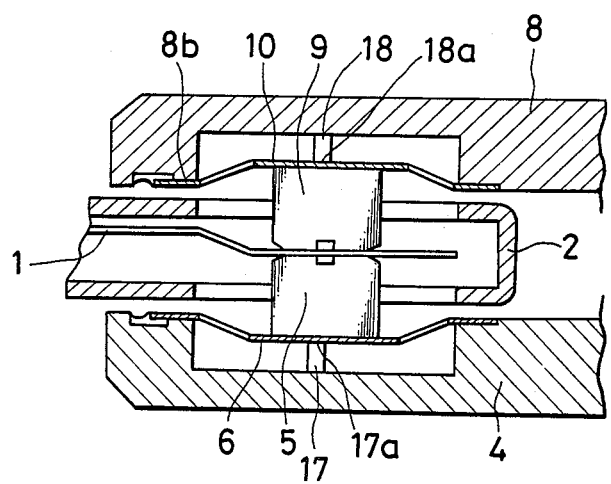

FIG. 20 is a schematic sectional side elevation showing another head supporting mechanism in the state in which the second magnetic head 9 thereof impinges upon the first magnetic head 5 thereof through the magnetic disk, as a result of movement of a cartridge 2 to the recording and reproducing position.

When the second magnetic head 9 impinges upon the first magnetic head 5, the resultant impact is transmitted through the first magnetic head 5 to the first supporting plates 6 so that this first supporting plate 6 warps to an extent more than that in the aforementioned recording and reproducing operations and toward the first column 17. When the warp of the first supporting plate 6 slightly exceeds that in the recording and reproducing state, the first supporting plate 6 comes into abutment against the leading end 17a of the first column 17 so that its further warp is regulated.

In the absence of the first column 17, that impact may be sufficient for elastically deforming and breaking the first plate 6 depending upon the shape of the first plate 6 in the free state in the warping direction, making recording and reproducing operations impossible. By bringing the first supporting plate 6 into abutment against the first column 17 to regulate the warp, however, the impact can be released to the carriage 4 from the first supporting plate 6 through the first column 17 so that the first supporting plate 6 can be protected against the impact during the recording and reproducing operations.

Moreover, the impact resulting from the impingement is also transmitted through the second magnetic head 9 to the second supporting plate 10 so that the second supporting plate 10 warps to greater extent than that in the recording and reproducing operations and toward the second column 18. When the warp of the second supporting plate 10 slightly exceeds that in the recording and reproducing operations, the second supporting plate 10 comes into abutment against the leading end 18a of the second column 18 so that its further warp is regulated.

In the absence of the second column 18, that impact may be sufficient for elastically deforming and breaking the second supporting plate 10 in dependence upon the shape of the second supporting plate 10, in the free state in the warping direction, making the recording and reproducing operations impossible. By bringing the second supporting plate 10 into abutment against the second column 18 to regulate the warp, however, the impact can be released to the carriage 8 from the second supporting plate 10 through the second column 18 so that the second supporting plate 10 can be protected against the impact during the recording and reproducing operations.

In the absence of the second column 18, moreover, the disk cartridge 2 comes into contact with that portion of the second supporting plate which is adhered to the mounting face 8b. As a result, the disk cartridge 2 or the second carriage 8 may be subject to breakage. By bringing the second supporting plate 10 into abutment against the second column 18 to regulate the warp, the disk cartridge 2 and the second carriage 8 can be protected from the aforementioned impact during recording and reproducing operations.

Referring to FIGS. 23, 24, 25 and 26, a magnetic head support having a higher resistance to an external vibration will be described.

Figure 23:
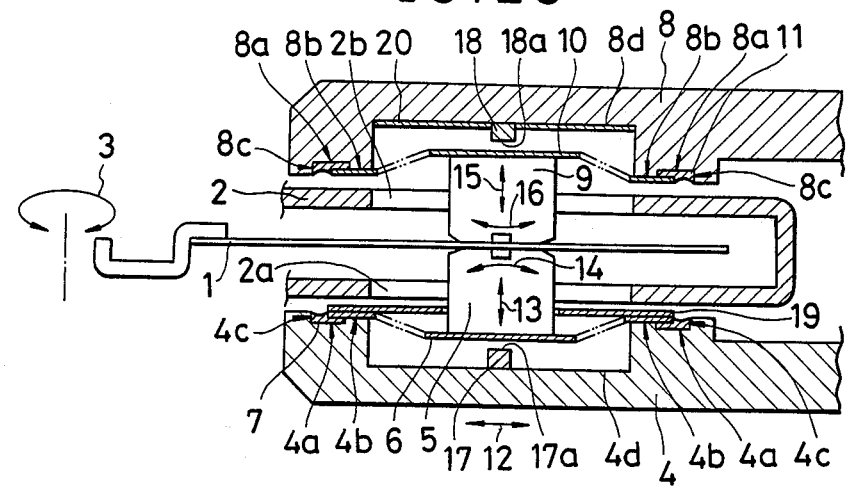
FIG. 23 is a section showing a portion of a further embodiment of the magnetic head supporting mechanism of the present invention.

The structure of FIG. 23 is similar to those of FIGS. 1 and 18 except for a supporting plate protector 19 and a shield plate 20, and therefore a detailed description will be omitted.

In the structure of FIG. 23, the second shield plate 20 for protecting the magnetic head from the disturbing noises is fixed on the bottom 8d of the second carriage 8 except for the portion occupied by the second column 18.

Moreover, the supporting plate protector 19 for regulating the floating of the first supporting plate is fixed on the first supporting plate at its first magnetic head mounting face.

Figure 24:
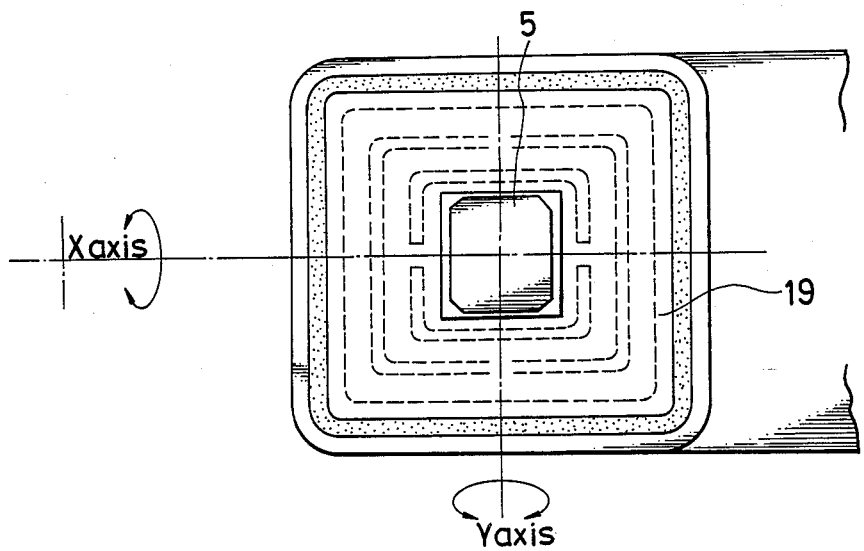
FIG. 24 is a top plan view showing a portion of FIG. 23.

FIG. 24 is a top plan view showing portions of the first magnetic head 5 and the supporting plate protector 19. The fixed portions of the supporting plate protector 19 and first supporting plate 6 are located at the outer circumference of the first supporting plate 6 fixed on the first supporting face 4b and at the first magnetic head mounting face. Here, the supporting plate protector is made of a highly permeable or conductive material.

Referring to FIG. 23, the flexibility of the first supporting plate 6 allows the first magnetic head 5 to move in the directions of the arrows 13 and to roll without any directional restriction, as exemplified by the arrows 14. Likewise, the flexibility of the second supporting plate 10 allows the second magnetic head 9 to move in the directions of the arrows 15 and to roll without any directional restriction, as exemplified by the arrows 16. As a result, complicated vibrations of various modes can be predicted for disturbances such as vibrations or impacts to establish resonances of various frequencies. This resonance phenomenon will be described with reference to FIG. 26.

Figure 3B:
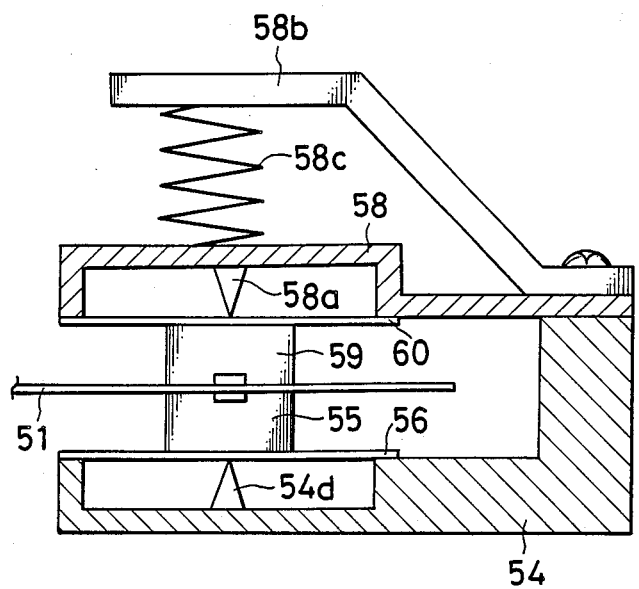
Figure 4:
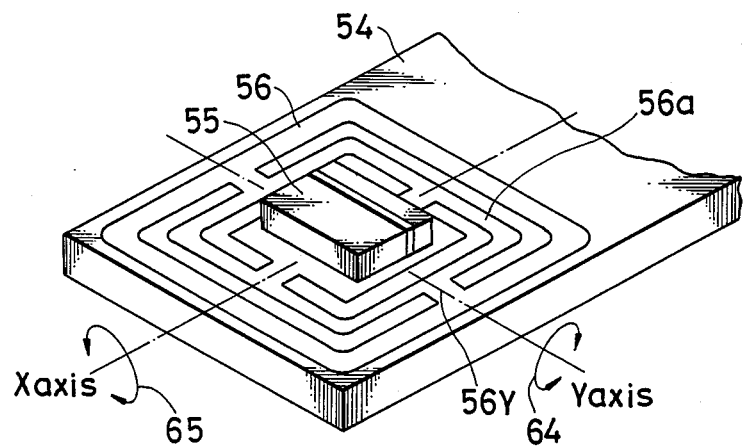
FIG. 4 is a perspective view showing a magnetic head supporting mechanism of the prior art.
Figure 5:
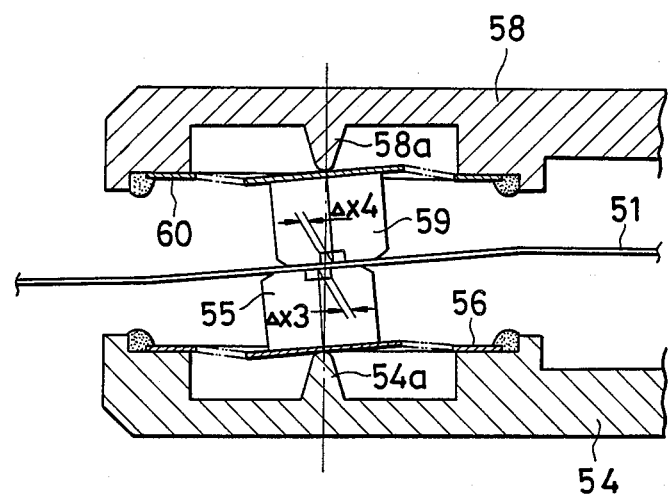
FIG. 5 is a diagram illustrating the off-track condition in a magnetic head supporting mechanism of the prior art due to the inclination of the magnetic heads.
Figure 6:
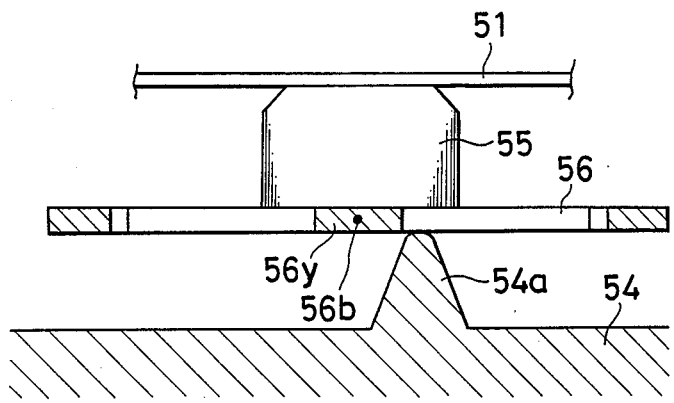
FIGS. 6 and 7 are diagrams illustrating the coactions of the pivot and supporting plate of the magnetic head supporting mechanism of the prior art.
Figure 7:
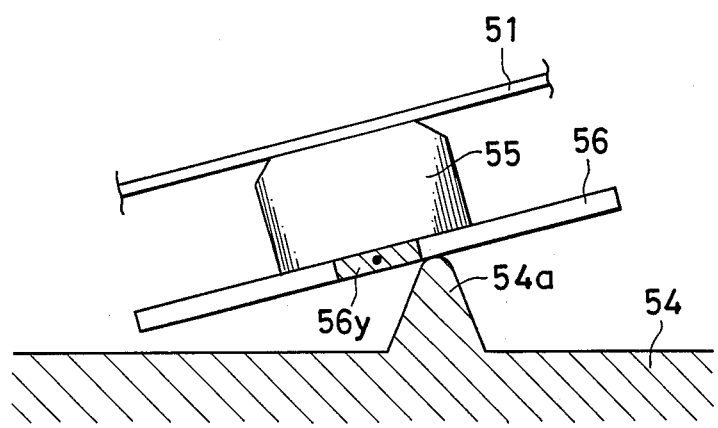
Figure 26:
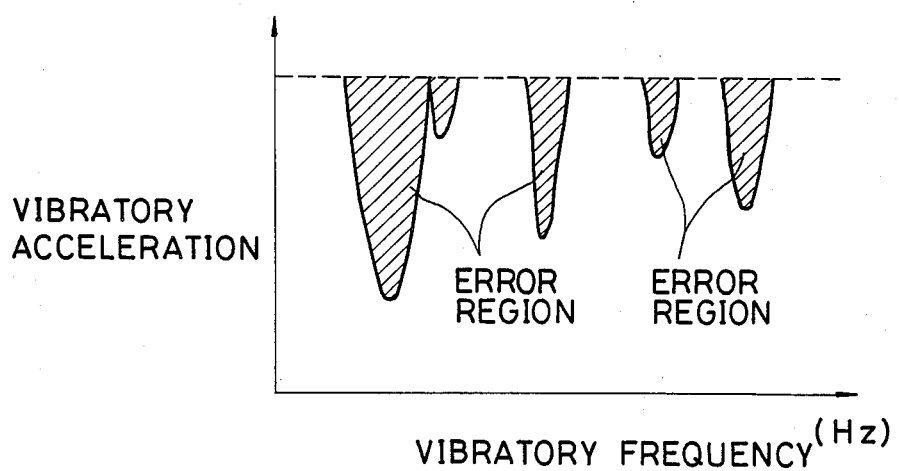

FIG. 26 depicts error regions in which the recording and reproducing operations are not possible for the prior art example of FIG. 3(b), as plotted against the vibratory frequency and the vibratory acceleration. From FIG. 26, it can be found that errors occur in various frequency bands.

Here, the following case will be considered as an example of the mechanism causing the aforementioned errors. FIG. 9(b) shows the instant when the resonant vibrations are caused from the state of FIG. 9(a) only in the directions of the arrows 13 or 15 by the disturbances. In this case, too, it is assumed that the first supporting plate 6 be inclined on the imaginary point P1 of inclination which is positioned in a plane substantially flush with the mounting face 4b and on the imaginary line joining the mounting face 4b. It is also assumed that the second supporting plate 10 be inclined on the imaginary point P2 of inclination which is positioned in a plane substantially flush with the mounting face 8b and on the imaginary line joining the mounting face 8b.

Now, if the aforementioned off-track $\Delta X1$ is allowable, the distance between a position 49 (at which the aforementioned intrinsic recording and reproducing position and the medium intersect) and the point P1 is longer than that of FIG. 9(a), and the off-track $\Delta X3$ shown in FIG. 9(b) is larger than the off-track $\Delta X1$ shown in FIG. 9(a). As a result, if the data is reproduced in this state, the amplitude of the reproduced signals is reduced making the reproduction incorrect or impossible.

If the errors are caused by the mechanism thus far described, the first supporting plate 6 cannot move toward the second supporting plate 10 from the imaginary line which is in the plane flush with and joining the mounting face 4b, since the structure in which the supporting plate protector for regulating the floating of the first supporting plate according to the present invention is fixed on the first supporting plate at the first magnetic head mounting face. As seen from FIG. 9(b), the distance between the aforementioned position 49 of the recording and reproducing medium and the point P1 does not become longer than that of FIG. 9(b). As a result, the supporting plate protector for regulating the floating of the first supporting plate is fixed according to the present invention on the first supporting plate at the first magnetic head mounting face. With this structure, therefore, the off-track is not increased preventing the reproduction from becoming incorrect or impossible.

Figure 25:
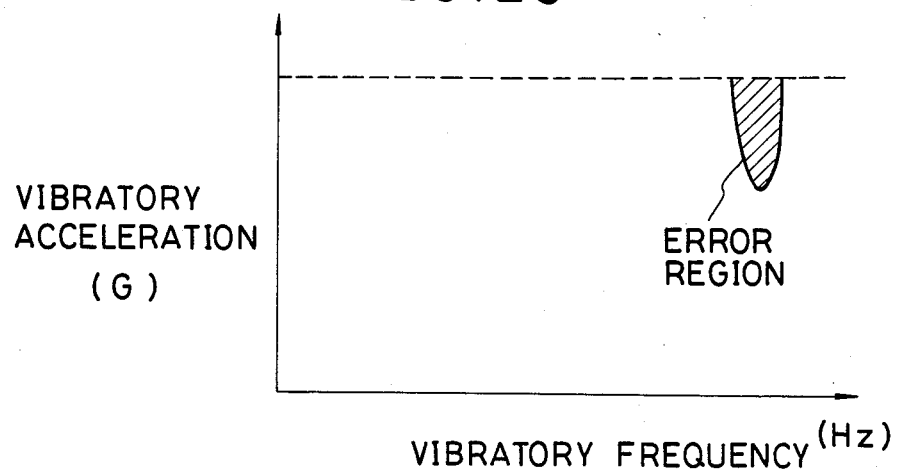
FIGS. 25 and 26 are diagrams illustrating how the present invention improves anti-vibration by plotting unrecordable and unreproducible error regions against a vibratory frequency and a vibratory acceleration for the models of the present invention and the prior art, respectively.

This state will be described with reference to FIG. 25. FIG. 25 depicts the error region in which the recording and reproducing operations are not possible for the model of the present invention, as plotted against the vibratory frequency and the vibratory acceleration. As compared with FIG. 26, it is found from FIG. 25 that the errors in various frequency ranges are considerably reduced.

These effects remarkably stabilize the reliability of the magnetic recording apparatus.

Now, the magnetic heads have their performances depending delicately upon the influences of disturbances such as the noises of electric and magnetic fields. In the present embodiment, the supporting plate protector is made of a highly permeable or conductive material which acts as a shield means which is effective for protecting the magnetic heads against the disturbances. If the supporting plate protector is made of a plate-shaped magnetic material such as iron, for example, it is effective for protection against disturbances such as magnetic noises. If, on the other hand, the supporting plate protector is made of a plate-shaped conductive material such as copper, it is effective for protection against disturbances such as electric noises.

This shield means will exhibit a better shielding effect as the magnetic heads are closer to the read/write gap for the recording and reproducing operations. With this in mind, the supporting plate protector 19 according to the present embodiment is positioned closer to the read/write gap than to the shield plate 49 of the example shown in FIG. 27 so that the shielding effects are improved.

As a counter-measure against disturbances, the supporting plate protector 19, made of a highly permeable or conductive material, is fixed on the first supporting plate at the first magnetic head mounting face except for the portion of the first magnetic head. As a result, the shielding effects can be remarkably easily made higher than those of the first shield plate 49 of the prior art.

Figure 27:
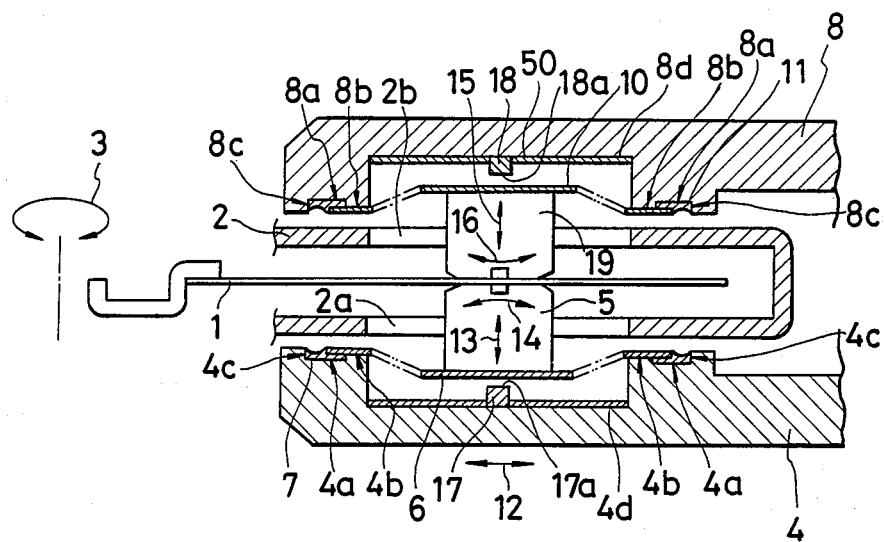
FIG. 27 a section showing a portion of a further embodiment of the magnetic head supporting mechanism of the present invention.

FIG. 27 shows a further embodiment of the structure in which a shield plate is mounted on each of first and second carriages without using the supporting plate protector 19. Reference numerals 49 and 50 appearing in FIG. 27 designate the shield plates. The remaining parts are similar to those of FIG. 18, and their repeated descriptions will be omitted.

As has been described hereinbefore, the present invention provides the various advantages which have been described in the foregoing embodiments. The magnetic head supporting mechanism of the present invention, in its various embodiments, bears the magnetic heads such that these heads can move in a generally perpendicular direction to the plane of the flexible disk, and sets both the spring rates in those directions and the torsional rigidities in the radial and tangential directions of the flexible disk within the proper ranges. This structure provides advantages including: excellent followability of the magnetic heads to the flexible disk can be obtained, the positional accuracy of the magnetic heads is improved to a higher level than that of the prior art, the lifetime of the flexible disk can be elongated, and the head supporting mechanism can be made resistant to breakage. Thus, the present invention provides a highly reliable magnetic head supporting mechanism having a simple structure so that it is highly effective for practical applications.

What is claimed is:

1. A magnetic head supporting mechanism for use with a flexible disk made of a medium suitable for magnetic recording and reproducing, comprising:
    a first magnetic head for making contact with one side of said flexible disk;
    a first supporting plate for supporting said first magnetic head in a manner to allow said first magnetic head to have freedom of pivotal movement in the radial and tangential directions of said flexible disk;
    a first carriage for mounting and carrying said supporting plate;
    a second magnetic head for making contact with the other side of flexible disk to hold said flexible disk between itself and said first magnetic head;
    a second supporting plate for supporting said second magnetic head in a manner to allow said second magnetic head to have freedom of pivotal movement in the radial and tangential directions of said flexible disk;
    a second carriage for mounting said second supporting plate and rotating said second supporting plate and said second magnetic head in a manner to face said first carriage, said second carriage being carried by said first carriage to follow the same; and
    press means for pressing said first magnetic head and said second magnetic head to each other,
    wherein said first and second supporting plates each comprise: a peripheral portion carried by a respective one of said carriages; a plurality of arms spaced from, and enclosed by, said peripheral portion; a central portion spaced from, and enclosed by, said arms and supporting a respective magnetic head; a first pair of tie bars extending along a first axis and connecting said arms to said peripheral portion; and a second pair of tie bars extending along a second axis and connecting said central portion to said pair of arms, said central portion being supported by said second pair of tie bars and said arms being supported by said first pair of tie bars, each said pair of tie bars being constructed to be allowed to twist about its respective axis, said arms being constructed to be allowed to warp when forces are applied thereto via the respective magnetic head, for permitting the respective magnetic head to pivot in a manner to follow the inclination of the flexible disk, said first and second axes normally lying in a plane parallel to the plane of the flexible disk, one of the axes extending in the radial direction of the disk and the other of the axes extending in the tangential direction of the disk, and said peripheral portion, said arms, said central portion and said tie bars being constructed to give said supporting plate a defined spring rate perpendicular to the plane of the flexible disk,
    wherein the spring rate of said first and second supporting plate in said generally perpendicular direction is set at about 50 g/mm or more, and
    wherein said first supporting plate and said second supporting plate support said first magnetic head and said second magnetic head, respectively, such that they can move in a generally perpendicular direction to the plane of said flexible disk in a manner constrained solely by the spring rates of said first supporting plate and said second supporting plate in the generally perpendicular direction.

2. A magnetic head supporting mechanism as claimed in claim 1, further comprising means for bringing said magnetic heads into and out of abutment against said flexible disk through said press means,
    wherein said first supporting plate and said second supporting plate are constructed to have elastic limits in said perpendicular direction which are larger than the maximum load created by said means for bringing said magnetic heads into and out of abutment against said flexible disk.

3. A magnetic head supporting mechanism as claimed in claim 1, wherein said first supporting plate and said second supporting plate are positioned to face the plane of said flexible disk and are made to have substantially equal rigidities.

4. A magnetic head supporting mechanism as claimed in claim 1, wherein said first and second supporting plates are constructed to have torsional rigidities in the radial and tangential directions of said flexible disk of about 400 g mm/rad to about 3,000 g mm/rad.

5. A magnetic head supporting mechanism as claimed in claim 1, wherein said first carriage and said second carriage each have a mounting face and said peripheral portions of said supporting plates are fixed to said carriage by adhering them in the respective mounting faces.

6. A magnetic head supporting mechanism as claimed in claim 5, wherein a space having a desirable clearance from said supporting plates is formed in a portion of each of said mounting faces and the spaces are filled with an adhesive to fix said supporting plates.

7. A magnetic head supporting mechanism as claimed in claim 6, further comprising adhesive flow-out preventing means, for preventing said adhesive from flowing out, disposed in a portion of said mounting face.

8. A magnetic head supporting mechanism as claimed in claim 6, wherein said adhesive is subject to filling dispersion, and further comprising adhesive filling buffer means, for absorbing the filling dispersion of said adhesive in a portion of said mounting face.

9. A magnetic head supporting mechanism for use with a flexible disk made of a medium suitable for magnetic recording and reproducing, comprising:
    a first magnetic head for making contact with one side of said flexible disk;
    a first supporting plate for supporting said first magnetic head in a manner to allow said first magnetic head to have freedom of pivotal movement in the radial and tangential directions of said flexible disk;

a first carriage for mounting and carrying said supporting plate;

a second magnetic head for making contact with the other side of flexible disk to hold said flexible disk between itself and said first magnetic head;

a second supporting plate for supporting said second magnetic head in a manner to allow said second magnetic head to have freedom of pivotal movement in the radial and tangential directions of said flexible disk;

a second carriage for mounting said second supporting plate and rotating to face said first carriage, said second carriage being carried by said first carriage to follow the same; and press means for applying pressure tending to force said first head and said second magnetic head toward each other, wherein said first and second supporting plates each comprise: a peripheral portion carried by a respective one of said carriages; a plurality of arms spaced from, and enclosed by, said peripheral portion; a central portion spaced from, and enclosed by, said arms and supporting a respective magnetic head; a first pair of tie bars extending along a first axis and connecting said arms to said peripheral portion; and a second pair of tie bars extending along a second axis and connecting said central portion to said pair of arms, said central portion being supported by said second pair of tie bars and said arms being supported by said first pair of tie bars, each said pair of tie bars being constructed to be allowed to twist about its respective axis, said arms being constructed to be allowed to warp when forces are applied thereto via the respective magnetic head, for permitting the respective magnetic head to pivot in a manner to follow the inclination of the flexible disk, said first and second axes normally lying in a plane parallel to the plane of the flexible disk, one of the axes extending in the radial direction of the disk and the other of the axes extending in the tangential direction of the disk, and said peripheral portion, said arms, said central portion and said tie bars being constructed to give said supporting plate a defined spring rate perpendicular to the plane of the flexible disk, and wherein said first supporting plate and said second supporting plate warp in a warping direction in response to said pressure and support said first magnetic head and said second magnetic head, respectively, such that said magnetic heads can move in a generally perpendicular direction to the plane of said flexible disk, and stopper means located at a position spaced at a predetermined small clearance in the warping direction for regulating the warp of said supporting plates by said pressure.

10. A magnetic head supporting mechanism as claimed in claim 9, wherein said stopper means is formed generally in a column shape.

11. A magnetic head supporting mechanism for use with a flexible disk made of a medium suitable for magnetic recording and reproducing, comprising:

a first magnetic head for making contact with one side of said flexible disk;

a first supporting plate for supporting said first magnetic head in a manner to allow said first magnetic head to have freedom of pivotal movement in the radial and tangential direction of said flexible disk, said first supporting plate having a mounting face for mounting said first magnetic head;

a first carriage for mounting and carrying said supporting plate;

a second magnetic head for making contact with the other side of flexible disk to hold said flexible disk between itself and said first magnetic head;

a second supporting plate for supporting said second magnetic head in a manner to allow said second magnetic head to have freedom of pivotal movement in the radial and tangential directions of said flexible disk;

a second carriage for mounting said second supporting plate and rotating in a manner to face said first carriage, said second carriage being carried by said first carriage to follow the same;

press means for pressing said first magnetic head and said second magnetic head to each other, wherein said first and second supporting plates each comprise: a peripheral portion carried by a respective one of said carriages; a plurality of arms spaced from, and enclosed by, said peripheral portion; a central portion spaced from, and enclosed by, said arms and supporting a respective magnetic head; a first pair of tie bars extending along a first axis and connecting said arms to said peripheral portion; and a second pair of tie bars extending along a second axis and connecting said central portion to said pair of arms, said central portion being supported by said second pair of tie bars and said arms being supported by said first pair of tie bars, each said pair of tie bars being constructed to be allowed to twist about its respective axis, said arms being constructed to be allowed to warp when forces are applied thereto via the respective magnetic head, for permitting the respective magnetic head to pivot in a manner to follow the inclination of the flexible disk, said first and second axes normally lying in a plane parallel to the plane of the flexible disk, one of the axes extending in the radial direction of the disk and the other of the axes extending in the tangential direction of the disk, and said peripheral portion, said arms, said central portion and said tie bars being constructed to give said supporting plate a defined spring rate perpendicular to the plane of the flexible disk, and wherein the spring rate of said first and second supporting plate in said generally perpendicular direction is set at about 50 g/mm or more, and wherein said first supporting plate and said second supporting plate support said first magnetic head and said second magnetic head, respectively, such that they can move in a generally perpendicular direction to the plane of said flexible disk; and a supporting plate protector, for regulating movements of said first supporting plate in response to external vibrations, fixedly arranged on a portion of the mounting face of said first supporting plate.

12. A magnetic head supporting mechanism as claimed in claim 11, wherein said supporting plate protector is made of a highly magnetically permeable material.

13. A magnetic head supporting mechanism as claimed in claim 11, wherein said supporting plate protector is made of a highly electrically conductive material.

* * * * *